United States Patent (10) Patent No.: US 11,306,931 B2
Kim et al. (45) Date of Patent: Apr. 19, 2022

(54) AIR PURIFIER

(71) Applicant: LG Electronics Inc., Seoul (KR)

(72) Inventors: Hongseok Kim, Seoul (KR); Jungwoo Lee, Seoul (KR); Junhyuk Jang, Seoul (KR); Taeyoon Kim, Seoul (KR); Myungjin Ku, Seoul (KR); Sukchun Kim, Seoul (KR); Seonmi Kim, Seoul (KR); Inmun Yu, Seoul (KR); Kunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 370 days.

(21) Appl. No.: 16/251,150

(22) Filed: Jan. 18, 2019

(65) Prior Publication Data

US 2019/0226695 A1 Jul. 25, 2019

(30) Foreign Application Priority Data

Jan. 19, 2018 (KR) .................. 10-2018-0007385
Feb. 19, 2018 (KR) .................. 10-2018-0019488
(Continued)

(51) Int. Cl.
*F24F 8/10* (2021.01)
*F24F 6/00* (2006.01)
(Continued)

(52) U.S. Cl.
CPC ................ *F24F 8/10* (2021.01); *F24F 6/00* (2013.01); *F24F 6/16* (2013.01); *F24F 13/20* (2013.01);
(Continued)

(58) Field of Classification Search
None
See application file for complete search history.

(56) References Cited

U.S. PATENT DOCUMENTS 2,717,148 A * 9/1955 Michael .................. F24F 6/04
261/16
3,610,589 A 10/1971 Paulin
(Continued)

FOREIGN PATENT DOCUMENTS

CN 200327418 11/2013
CN 203274184 11/2013
(Continued)

OTHER PUBLICATIONS

KR-101225981-B1 Translation by KIPO, original provided as part of IDS (Year: 2013).*
(Continued)

*Primary Examiner* — Christopher P Jones
*Assistant Examiner* — Brit E. Anbacht
(74) *Attorney, Agent, or Firm* — Birch, Stewart, Kolasch & Birch, LLP

(57) ABSTRACT

A humidifying air purifier includes a body frame having an opened front and rear, a fan housing coupled to a rear end of the body frame and having a fan intake, a housing cover coupled to a rear end of the fan housing to accommodate an air blowing fan, and an air discharge port formed at an upper end of the fan housing and an upper end of the housing cover. A waterwheel motor is installed on a front surface of the fan housing and positioned outside the fan intake, a driving gear is coupled to the waterwheel motor, a door assembly is configured to be pushed into or drawn out from a front end of the body frame, a water tub is accommodated in a lower side of the door assembly, and a humidifying filter assembly is inserted into the water tub.

12 Claims, 23 Drawing Sheets

(30) Foreign Application Priority Data

| Feb. 19, 2018 | (KR) | 10-2018-0019571 |
|---|---|---|
| Feb. 23, 2018 | (KR) | 10-2018-0022039 |
| Nov. 1, 2018 | (KR) | 10-2018-0133160 |

(51) Int. Cl.
  *F24F 13/20* (2006.01)
  *F24F 6/16* (2006.01)
  *F24F 8/117* (2021.01)

(52) U.S. Cl.
  CPC ......... *F24F 8/117* (2021.01); *F24F 2006/008* (2013.01); *F24F 2013/205* (2013.01)

(56) References Cited

U.S. PATENT DOCUMENTS

| 3,616,624 | A | | 11/1971 | Marsh | |
|---|---|---|---|---|---|
| 4,234,526 | A | | 11/1980 | Mackay | |
| 4,737,173 | A | | 4/1988 | Kudirka | |
| 4,953,991 | A | | 9/1990 | Rock | |
| 5,676,438 | A | | 10/1997 | Jeong | |
| 6,705,535 | B1 | | 3/2004 | Morton | |
| 9,021,829 | B2 | * | 5/2015 | Jung | F24F 13/1486 62/409 |
| 10,190,786 | B2 | * | 1/2019 | Nam | F24F 13/20 |
| 10,945,570 | B2 | * | 3/2021 | Son | A47L 5/362 |
| 2006/0016337 | A1 | | 1/2006 | Taylor et al. | |
| 2006/0021359 | A1 | | 2/2006 | Hur | |
| 2006/0278084 | A1 | | 12/2006 | Kim | |
| 2009/0096118 | A1 | * | 4/2009 | Brown | F24F 6/04 261/128 |
| 2014/0145355 | A1 | * | 5/2014 | Shimizu | F24F 6/06 261/30 |
| 2014/0216259 | A1 | * | 8/2014 | Iwaki | F24F 11/30 96/19 |
| 2015/0084215 | A1 | * | 3/2015 | Ojeda | F24F 6/00 261/71 |
| 2015/0125292 | A1 | | 5/2015 | Karst et al. | |
| 2016/0010882 | A1 | | 1/2016 | Lee et al. | |
| 2016/0108822 | A1 | | 1/2016 | Lee | |
| 2016/0175757 | A1 | * | 6/2016 | Yoon | B01D 47/18 261/30 |
| 2016/0212874 | A1 | | 7/2016 | Ogawa | |
| 2017/0045245 | A1 | * | 2/2017 | Nam | F24F 6/00 |
| 2017/0122582 | A1 | * | 5/2017 | Chong | F24F 6/16 |
| 2017/0122584 | A1 | * | 5/2017 | Chong | F24F 6/16 |
| 2017/0122587 | A1 | * | 5/2017 | Son | F24F 8/133 |
| 2017/0122594 | A1 | | 5/2017 | Lee et al. | |
| 2017/0122602 | A1 | * | 5/2017 | Son | F24F 13/20 |
| 2019/0226695 | A1 | * | 7/2019 | Kim | F24F 6/16 |
| 2019/0226697 | A1 | * | 7/2019 | Kim | F24F 3/16 |

FOREIGN PATENT DOCUMENTS

| CN | 204519811 | | 8/2015 |
|---|---|---|---|
| JP | H07120006 | | 5/1995 |
| JP | H0810544 | | 1/1996 |
| JP | 2002-291549 | | 10/2002 |
| JP | 2004347211 | | 12/2004 |
| JP | 2008-95988 | | 4/2008 |
| JP | 2009-36401 | | 2/2009 |
| JP | 2010-84992 | | 4/2010 |
| JP | 2011-58661 | | 3/2011 |
| JP | 2013-26623 | | 2/2013 |
| JP | 2014-66399 | | 4/2014 |
| JP | 2016-114302 | | 6/2016 |
| JP | 2016211849 | | 12/2016 |
| JP | 2017-12326 | | 1/2017 |
| JP | 2017062092 | | 3/2017 |
| JP | 3214558 | U | 1/2018 |
| KR | 1997-0002811 | | 3/1995 |
| KR | 20-1997-0002811 | | 8/1999 |
| KR | 10-2006-0111037 | | 10/2006 |
| KR | 10-0766430 | | 10/2007 |
| KR | 10-2008-0055018 | | 6/2008 |
| KR | 10-2008-0055457 | | 6/2008 |
| KR | 10-2010-0077951 | | 7/2010 |
| KR | 10-2012-0032393 | | 4/2012 |
| KR | 10-2012-0071991 | | 7/2012 |
| KR | 10-1225981 | | 1/2013 |
| KR | 101225981 | B1 * | 1/2013 |
| KR | 10-2014-0028586 | | 3/2014 |
| KR | 20140073326 | | 6/2014 |
| KR | 10-2015-0146185 | | 12/2015 |
| KR | 10-2016-0006268 | | 1/2016 |
| KR | 10-1619719 | | 5/2016 |
| KR | 10-2016-0063844 | | 6/2016 |
| KR | 10-2016-0144678 | | 12/2016 |
| KR | 10-2017-0051276 | | 5/2017 |
| KR | 10-1769817 | | 8/2017 |
| KR | 10-2018-0003001 | | 1/2018 |
| KR | 10-2013-0127093 | | 1/2020 |

OTHER PUBLICATIONS

Korean Notice of Allowance dated Oct. 16, 2020.
Indian Office Action dated Jun. 30, 2020.
Korean Notice of Allowance dated Aug. 19, 2020.
Indian Office Action dated Oct. 29, 2020.
Indian Office Action dated Apr. 4, 2021 in Application No. 201914001962.
Office Action dated Jul. 29, 2021 in U.S. Appl. No. 16/253,813.
Office Action dated Jul. 15, 2021 in U.S. Appl. No. 16/253,772.

* cited by examiner

AIR PURIFIER

CROSS-REFERENCE TO RELATED APPLICATIONS

The present application claims the benefit of priority under 35 U.S.C. 119 and 35 U.S.C. 365 to Korean Patent Application No. 10-2018-0007385 (filed on Jan. 19, 2018), No. 10-2018-0019571 (filed on Feb. 19, 2018), No. 10-2018-0019488 (filed on Feb. 19, 2018), No. 10-2018-0022039 (filed on Feb. 23, 2018) and No. 10-2018-0133160 (filed on Nov. 1, 2018), the contents of all of which are hereby incorporated by reference in their entireties.

BACKGROUND

The present invention relates to a humidifying air purifier.

The air purifier is understood as a device for drawing in and purifying contaminated air, and then discharging the purified air. For example, the air purifier may include an air blowing device for flowing outside air into the inner portion of the air purifier, and a filter for filtering dust, germs, or the like in the air.

A humidifier is understood as a device for drawing in air to humidify the air and then discharging the humidified air to provide moisture to the air. The humidifiers in the related art are classified into a vibration type in which water is atomized in a vibration plate and then the atomized water is discharged into the air and natural evaporation type in which water is naturally evaporated in the humidifying filter. The natural evaporation type humidifier includes a disk type humidifier in which a disk is rotated using a driving force and water is naturally evaporated from the surface of the disk in the air and a humidifying filter type humidifier in which water is naturally evaporated by flowing air in the water-soaked humidifying medium.

In recent years, a humidifying air purifier has been developed which adds a humidification function to an air purifier. In a case of humidifying air purifiers, for hygiene, filters and water containers need to be periodically cleaned or replaced by users.

Related art related to this is KR10-2017-0051276A (hereinafter, referred to as "related art 1").

However, the internal structure of the humidifying air purifier disclosed in the related art 1 is relatively complicated. In the related art 1, there is a problem that it is difficult to easily manipulate a water container which is required to be filled with water from time to time by the users.

In this connection, KR 10-1225981 B1 (hereinafter, referred to as related art 2) discloses a technique for easily drawing or inserting the water container and a tray in which the water container is installed out of or into the side of the air purifier, respectively.

In the related art 2, a configuration is disclosed which includes a rotating rotator (or driving gear) in which a driving unit is provided, a humidifying gear (or waterwheel) which rotates by receiving a rotational force of the rotator, and a lifter (or collector) which is provided at the circumference (or periphery) of the humidifying gear, and the lifter pours water stored in the tray by rotating the humidifying gear to wet the humidifying filter provided therein.

In the related art 2, the humidifying gear is provided so as to be slidably drawn into the air purifier in the side direction and engaged with the rotator. Such a coupling method has an advantage in that the engagement between gears can be stably performed.

However, until the humidifying gear comes into contact with the rotator and the humidifying gear is completely drawn into the air purifier, the rotator can be forcibly rotated by a predetermined rotation angle by the force of the user pushing the humidifying gear. Accordingly, the withdrawal and the insertion of the humidifying gear of the related art 2 is not smooth, and noise due to contact between the gears and forced rotation of the motor is generated.

In addition, since the insertion of the humidifying gear is completed only when the user provides a force equal to or greater than a threshold value for forcing the rotation of the motor, the combination process of the humidifying gear and the rotator is not smooth.

In the end, the combination of the humidifying gear and the rotator disclosed in the related art 2 has a problem such as generation of noise, a relatively large force required by the user, and a rough and uneven combination process.

Meanwhile, the humidifying gear of the related art 2 is positioned below the air circulation hole for guiding the air intake by the air blowing fan to come into contact with the water of the tray. Therefore, the rotator engaging with the humidifying gear is also positioned to block a portion of the upper portion of the air circulation hole.

In addition, the lift of the related art 2 is integrally formed with the humidifying gear which engages with the rotator so as to be rotated. Accordingly, the lift and the rotator interfere with the flow of air.

In addition, the flow of the air can be concentrated in an overlapping area between the air circulation hole and the center portion of the humidifying gear in a front and rear direction. The air flowing into the area other than the overlapping area may cause flow interference, loss, and noise in the course of being sucked into the air blowing fan.

In the end, the shape, the coupling relationship and the position of the humidifying gear and the rotator disclosed in the related art 2 complicate the flow path of the air drawn in by the air blowing fan and cause a problem of generating flow interference, flow loss, and flow noise.

The humidifying gear support portion of the related art document 2 is formed to support the humidifying gear in the front. The humidifying gear support portion forms one surface extending upward from the front end of the tray. Therefore, the intake of the air introduced into the humidifying filter is blocked. In other words, the humidifying gear support portion can function as a resistance against the flow direction of the air drawn into the humidifying filter.

In the end, the humidifying gear support portion disclosed in the related art 2 has a problem that the intake area of the air is relatively narrowed and a flow loss due to the resistance is generated.

In addition, the humidifying gear is supported by the humidifying gear support portion at the front, and an air circulation hole of an air blowing fan into which air is drawn into the air blowing fan is disposed at the rear. Accordingly, the humidifying gear is caused to generate vibrations in the front and rear direction due to the flow of the air drawn into the air blowing fan, resulting in a generation of vibration noise.

In the end, the humidifying gear support portion disclosed in the related art 2 has a problem that it cannot prevent the vibration of the humidifying gear.

Meanwhile, a water container positioned on one side of the humidifying gear in the related art 2 is installed in a water storage tub formed by a tray. The water storage tub is provided so as to communicate with the humidifying gear.

However, in the related art 2, there is no recognition of the problem of noise (hereinafter, referred to as 'water supply noise') generated when water is supplied from the water container to the water storage tub of the tray and motive or suggestion with respect to means for minimizing the water supply noise.

In the end, the water container and the tray disclosed in the related art 2 have a problem that it is difficult to minimize the water supply noise.

To summarize, in the related art 2, there is no suggestion or motivation that would direct a person skilled in the art to solve the problems described above.

Meanwhile, the problems raised on the basis of the related art 2 make it difficult to satisfy the sensory or emotional demands of the product user.

The sensory or emotional demand of the user is one of the important factors for determining the quality and the degree of upgrading of the product. Therefore, a technique capable of solving the problems described above can result in the advance and the upgrading of the product.

SUMMARY

The present invention has been made to solve the above problems and an objective of the present invention is to provide a humidifying air purifier which allows a user to easily access a water container and a filter by including a door that slides out of and into a cabinet of an air purifier and disposing the water container and the filter on the door.

In addition, another objective of the present invention is to provide a humidifying air purifier which is capable of minimizing flow interference, flow loss, or flow noise on the air flow side of a humidifying air purifier.

In addition, another objective of the present invention is to provide a humidifying air purifier which is capable of reducing driving noise and vibration of a rotating humidifying filter.

In addition, another objective of the present invention is to provide a humidifying air purifier which is capable of minimizing noise ("water supply noise") generated when water is supplied from a water container to a water storage space.

In addition, another objective of the present invention is to provide a humidifying air purifier in which a driving gear for rotating a humidifying filter and a filter gear coupled to a waterwheel can be coupled or separated in a front and rear direction, which coincides with a front and rear direction in which the door of the humidifying air purifier moves as it is opened and closed.

In addition, another objective of the present invention is to provide a humidifying air purifier which is capable of maximizing the intake area of air flowing into a humidifying filter.

In addition, another objective of the present invention is to provide a humidifying air purifier which is capable of minimizing a force required by a user for coupling between a driving gear and a filter gear.

In addition, another objective of the present invention is to provide a humidification air purifier which has a smooth and stable coupling between a waterwheel provided in a door assembly and a driving gear provided in a cabinet.

In addition, another objective of the present invention is to provide a humidifying air purifier which is capable of stably maintaining the balance of a humidifying filter.

In addition, an objective of the present invention is to provide a humidifying air purifier in which gear teeth are easily engaged with each other in engagement between two gears in the front and rear direction.

In addition, another objective of the present invention is to provide a humidifying air purifier which can easily couple two gears in a direction perpendicular to the rotation direction of the gears.

In order to achieve the objectives described above, a double sealing structure for reducing water supply noise, fan driving noise, waterwheel noise and the like can be proposed in the humidifying air purifier according to the present embodiment.

The humidifying air purifier includes a polyhedral-shaped body frame in which a front surface, a rear surface, and an upper surface are opened; a door assembly which selectively shields an opened front surface of the body frame; a fan housing which is coupled so as to shield the opened rear surface of the body frame and in which a fan intake through which air flows is formed; an electric plate which shields the opened upper surface of the body frame; a housing cover which is coupled to a rear side of the fan housing to surround an air blowing fan; a discharge port through which the air passing through the air blowing fan is discharged and which is defined as a space formed by the upper end of the fan housing and the upper end of the housing cover, a first motor which supplies a driving force to the air blowing fan and is coupled to a rear surface of the fan housing so as to be positioned at the center of the air blowing fan and the fan intake; and a second motor which is coupled to the front surface of the fan housing so as to be positioned outside the fan intake.

Accordingly, a flow path of air to be introduced or discharged can be defined by driving the air blowing fan. The flow path of the air can be understood as a path for allowing noise generated from a noise source such as a motor, a gear, or the like to escape into the user's living environment.

Accordingly, the humidifying air purifier according to the embodiment of the present invention avoids the creation of a flow path of the air that allows noise to escape into a user's environment and disposes the noise source in a space formed by shielding the opened surface of the body frame so that the leakage of noise to the outside can be minimized.

The humidifying air purifier may further include a humidifying filter assembly which is installed at the rear of the door assembly to block the front of the second motor.

In addition, the humidifying air purifier may further include an air filter assembly which is installed in front of the door assembly.

A buffer space for canceling a sound wave may be formed between the air filter assembly and the humidifying filter assembly. Accordingly, the sound waves generated by the plurality of noise sources in the buffer space are canceled from each other, so that the noise that is exposed to the outside can be minimized.

The buffer space may be formed such that the volume thereof increases toward the upper portion. Accordingly, the noise generated by the noise source can be canceled inside the humidifying air purifier.

In addition, a sound absorbing material may be installed on both side surfaces of the body frame defining the buffer space.

The height of the buffer space may be defined as a distance between the electric plate and the water container. The width of the buffer space in the front and rear direction may be defined by a distance between the air filter assembly and the humidifying filter assembly. Here, the buffer space may be formed such that the upper end width DH is greater than the lower end width DL.

In addition, the humidifying air purifier may further include a water container which is installed in the door assembly and positioned between the air filter assembly and the humidifying filter assembly.

The humidifying filter assembly includes: a humidifying filter case which extends from the rear lower end of the water container to the electric plate so as to block the front of the second motor; and a humidifying filter which is supported by the humidifying filter case and is positioned so as to correspond to the fan intake.

The buffer space may be formed between a front surface of the humidifying filter case and a rear surface of the air filter assembly.

In the humidifying filter case, an intake opening corresponding to the fan intake may be formed at the center thereof.

The door assembly may further include a water tub into which the water container and the humidification filter assembly are inserted. The water tub may be provided with a water storage space in which water provided from the water container is stored.

The humidifying filter assembly may further include a waterwheel which absorbs water of the humidifying filter by rotating while receiving power from the second motor at the rear of the intake opening and pumping water in the water storage portion by the rotation.

Meanwhile, the humidifying air purifier includes a side panel which is coupled to both side surfaces of the body frame and extends higher than the electric plate; a rear panel which is coupled to a rear end of the side panel and shields the rear side of the housing cover; an upper panel which is coupled to an upper end of the side panel and shields an upper side of the electric plate; and a door panel which forms a front surface of the door assembly so as to be positioned in a plane formed by the front ends of the upper panel and the side panel. Accordingly, the inner space of the body frame can be sealed in a double manner.

In addition, an intake through which air flows may be formed on a bottom surface of the door assembly.

In another point of view, a humidifying air purifier according to an embodiment of the present invention may provide a structure of the humidifying filter assembly which can minimize noise caused by friction with water stored by a rotating waterwheel and improve the humidifying efficiency of the air.

The humidifying air purifier includes a door assembly which is drawn out of a cabinet; a water tub which is provided in the door assembly and forms a water storage space in which water is stored; and a waterwheel which is disposed so that a lower end of the waterwheel is submerged into the water in the water storage space and in which the humidifying filter is provided.

In addition, the humidifying air purifier may further include a waterwheel motor which is coupled to the front surface of the fan housing and provides a force so that the waterwheel is rotated; and a humidifying filter case which shields the waterwheel from the front and forms an intake opening into which air flows at a position corresponding to the front of the humidifying filter.

In addition, the humidifying air purifier may further include a shaft support which extends upward from a rear end of the humidifying filter case and supports a central shaft of the waterwheel from the rear.

The waterwheel can be arranged such that the shortest distance D1 from the uppermost end to the humidifying filter case is shorter than the shortest distance D2 from the lowermost end to the humidifying filter case.

Accordingly, when the waterwheel is inserted into the water of the water storage portion by rotation, the force in the vertical direction which generates the friction noise can be relatively reduced.

In addition, the waterwheel may be disposed such that the upper end thereof is inclined forward relative to the lower end thereof.

In addition, the waterwheel may be inserted into the water in the water storage space so as to have an inclination relative to the top surface of the water.

In addition, the central shaft of the waterwheel may form a groove such that a frame fixing the humidifying filter is obliquely coupled. Here, the groove may be recessed in an oblique direction from the outer surface of the central shaft. Accordingly, the frame for fixing the humidifying filter can be disposed in an oblique direction.

The frame may include an outer frame extending along the circumference (or periphery) of the humidifying filter and a filter frame fixing the front and rear of the humidifying filter.

The waterwheel further may include a filter gear which engages with a driving gear coupled to the waterwheel motor. Here, the filter gear is positioned on the rear side of the outer frame and may extend along the extending direction of the outer frame.

The shaft support may include a seating groove that is provided with a circular configuration for seating of the central shaft. Therefore, the central shaft of the waterwheel can be seated in the seating groove, thereby achieving a stable balance.

In another point of view, a humidifying air purifier according to an embodiment of the present invention may propose a waterwheel structure which minimizes noise due to friction with water stored by a rotating waterwheel.

The humidifying air purifier may include a door which is provided to be inserted into or drawn out of a front surface of a cabinet; a waterwheel motor which is coupled to the cabinet, a water storage portion which is placed on the door, in which water is stored; a water tub which forms a water container seating surface in which the water container is seated, and a waterwheel which is inserted into the water storage portion and rotated by the waterwheel motor.

The waterwheel may include a humidifying filter which absorbs water in the water storage portion by rotation.

In addition, the waterwheel may further include a humidifying filter unit which includes two outer frames extending along the periphery of the humidification filter so as to support the humidification filter in the front and rear direction and a flowing groove defined by a space between the two outer frames.

In addition, the waterwheel may further include a collecting part which covers a portion of the flowing grooves and has walls extended so as to connect the edges of the two outer frames.

Accordingly, when the collecting part is inserted into the water stored in the water storage space of the water tub, one edge of the collecting part can come into contact with the water by rotation. In other words, the size, length, and the number of structures that come into contact with the water can be relatively reduced.

In addition, since the outer frame is continuously rotated into the water of the water storage portion without the friction surface, the portion of the water storage portion which comes into contact with water is an edge surface of the upper wall defining the inflow hole. Therefore, the friction noise between the waterwheel and water can be reduced.

The humidifying filter unit may further include a collecting rib which defines the bottom of the flowing groove and extends from one of the two outer frames and contacts the other.

The collecting rib may be formed with a drop hole, which is an opening for allowing water to flow to the humidifying filter. Accordingly, the water flowing into the collecting part can pass through the drop hole when the collecting part and the collecting rib are turned upside down by rotation.

The wall of the collecting part may include a shielding wall which vertically extends from the collecting rib to outer edges (or corners) of the two outer frames and an upper wall which extends along outer edges (or corners) of the two outer frames from the end portion of the shielding wall.

Accordingly, the collecting part can pump water of the water storage portion by rotation.

The shielding wall may extend radially from the collection rib. The upper wall may extend from the shielding wall in a rotating direction of the waterwheel.

The collecting part may be formed to have a longitudinal section of '¬' shape. The collecting part may form an inflow hole which is positioned in front with respect to the rotating direction of the waterwheel.

Accordingly, the water in the water storage portion can flow into the inflow hole and flow toward the shielding wall.

The lower end of the outer frame may be positioned below the upper end of the water storage portion to be submerged in the water of the water storage portion.

The humidifying filter may be sandwiched between the two outer frames.

In addition, the two outer frames may be detachably coupled.

The humidifying filter unit may further include a first frame which supports the humidifying filter in the front, and a second frame which supports the humidifying filter from the rear. Here, the two outer frames may be the first frame and the second frame, respectively.

The outer surface of the collecting part may form one surface with the outer surface of the outer frame. Therefore, noise caused by friction with water stored can be reduced.

The humidifying filter unit may be formed in a circular shape.

In addition, the humidifying filter unit may be disposed such that the flowing groove into which the water stored along the outer peripheral portion flows and the collecting part may be alternately disposed. The collecting part may include a shielding wall which shields the flowing grooves in the circumferential direction and an upper wall which radially shields the flowing grooves.

In another point of view, a humidifying air purifier according to an embodiment of the present invention can provide a structure which is capable of reducing vibrations and noise caused by driving a rotating waterwheel.

The humidifying air purifier includes a door which is connected to a cabinet and a rail, an waterwheel motor which is coupled to the inner portion of the cabinet and rotates the waterwheel; a waterwheel which is inserted into the water tub installed in the door and collects the water stored in the water tub by rotation of the waterwheel, and a humidifying filter case which is inserted into the water tub to cover the waterwheel and has an opening at a position corresponding to the waterwheel.

The humidifying air purifier may include a shaft support which extends from a rear end of the humidification filter case to support a central shaft of the waterwheel from the rear side, and a guide roller which contacts the waterwheel so as to allow rolling motion with the waterwheel in the front and rear direction.

Accordingly, it is possible to avoid contact with the surrounding configuration despite the rotation of the waterwheel. The waterwheel can be rotated while maintaining a stable balance, as a result of the guide roller. In other words, the vibration of the waterwheel can be relatively reduced.

A plurality of guide rollers may be spaced apart from each other along the periphery defining the intake opening of the humidifying filter case.

In addition, the guide roller may include a front guide roller which contacts the outer frame of the waterwheel from the front and a rear guide roller which contacts the outer frame of the waterwheel from the rear.

The front guide roller may be installed on the inner surface of the humidifying filter case, and the rear guide roller may be installed on the inner surface of the shaft support.

The guide roller is capable of rolling motion along the rotation of the waterwheel. Accordingly, noise caused by rotation of the waterwheel can be reduced.

In addition, the air blowing fan may be positioned behind the opening of the humidifying filter case.

In addition, the guide roller may include a roller rib which protrudes from an inner surface of the humidifying filter case; a roller shaft which is inserted into the roller rib; and a roller which rotates around the roller shaft.

In addition, the front guide roller may support an upper portion of the front surface of the waterwheel. The rear guide roller may support a lower portion of the rear surface of the waterwheel.

In addition, the roller may include a wheel or a ball shape.

The rotation central shaft of the guide roller may be perpendicular to the rotation central shaft of the waterwheel.

A support protrusion which protrudes to support a lower portion of the front surface of the waterwheel may be formed on the inner surface of the inner surface of the humidification filter case.

In another point of view, the humidifying air purifier can provide a structure which is capable of reducing noise generated during a process of supplying water from a water container to a water storage space of a water tub.

The humidifying air purifier may include a cabinet which has a front surface formed with an opening; a door assembly which is provided to be drawn into or out of a front surface of the cabinet; a water container which is accommodated in the door assembly and in which water is stored, and a humidifying filter assembly which is positioned at the rear of the water container.

The water tub includes a first water storage portion which forms a water container seating surface formed so that the lower end of the water container is supported and is defined as a space recessed downward from a center of the water container seating surface; and a second water storage portion which is defined as a space extending from the first water storage portion to the rear and formed in a larger volume than the first water storage portion.

Accordingly, since the water container is seated in the water tank to perform water supply, it is possible to propose a structure in which the distance from the water storage portion becomes near or close to the maximum.

Therefore, there is an advantage that water supply noise generated when water in the water container is supplied to the water tub can be reduced, as compared with a case where the water tub and the water tank are relatively far apart or separately provided.

In addition, in a case where the water container is seated on the water container seating surface, the water stored in the water container can flow from the first water storage portion having a relatively small volume to the second water storage portion having a relatively large volume.

Accordingly, the water supply noise can be reduced by the volume of the water storage space gradually increasing along the flow direction of the water.

In addition, a valve device which discharges the stored water may be provided on the bottom surface of the water container.

In addition, the maximum height H1 of the first water storage portion may be smaller than the maximum width H2 formed by the first water storage portion and the second water storage portion.

In addition, the maximum height H1 of the first water storage portion may be defined as the length of a perpendicular line drawn from the lowermost point of the water tub to a water container seating surface where the lower end of the water container is in contact. The maximum width H2 formed by the first water storage portion and the second water storage portion may be defined as a length of a perpendicular line drawn from the front end of the first water storage portion to the rearmost end of the second water storage portion.

In addition, the first water storage portion and the second water storage portion may have bottom surfaces of the same height. Therefore, the first water storage portion and the second water storage portion can form the same water level.

The water tank may further include a float device which is accommodated in the first water storage portion and capable of adjusting water discharged from the water container.

The float device may guide the water discharged downward from the water container so as to flow in the radial direction. The water passing through the float device can flow to the first water storage portion and the second water storage portion.

In addition, the flowing direction of the water stored in the water container is changed in the radial direction while the water flows downward, the water is introduced into the first water storage portion while being dropped again, and flows from the first water storage portion to the side to be capable of introducing into the second water storage portion having a large volume.

Accordingly, since the flow direction of the water discharged from the water container is bent a number of times and flows in a direction having a relatively large volume, water supply noise can be reduced.

The float device may have an outer surface having a relatively expanding radius.

In addition, the water tub may further include an engaging portion which is recessed on both side ends of the water tank so that the humidifying filter assemblies are seated. Therefore, both side surfaces of the humidifying filter assembly can be seated in the engaging portion.

The engaging portion may form a step protrusion which protrudes to be inserted into the humidifying filter assembly.

In addition, the water tub may further include a front incision portion which is formed by cutting the central portion of the front end downward.

The front incision portion may be positioned below the lid of the water container. Accordingly, the user can easily lift the water container upward.

In another point of view, a humidifying air purifier according to an embodiment of the present invention can provide a structure which is capable of minimizing friction noise between two gears while facilitating engagement between two gears.

The humidifying air purifier includes a cabinet which is opened in one direction, a door assembly which is provided so as to draw out in the opening direction of the cabinet, a humidifying filter unit which is accommodated in the door assembly and absorbs water by rotation, a waterwheel motor which is coupled to the cabinet, a driving gear which is coupled to the waterwheel motor and rotates, and a filter gear which is installed on a rear side of the humidifying filter unit and interlocks with the driving gear.

The rotation direction of the driving gear or the filter gear may be perpendicular to a direction of drawing the door assembly into.

Accordingly, when the door assembly is moved rearward and coupled with the cabinet, the driving gear and the filter gear can be easily engaged with a relatively small force.

In other words, it is possible to facilitate the engagement between the two gears whose degree of difficulty is increased by the door assembly which is not moved in and out of the side surface but in and out of the front surface of the waterwheel.

The filter gear may be engaged with the driving gear along a direction parallel to the direction in which the door assembly is drawn into the cabinet.

In addition, the driving gear and the filter gear may be in contact with and engaged with each other so as to be slid into engagement with each other while the door assembly is drawn into the cabinet.

The filter gear may include filter gear teeth and a slip guide which protrudes rearward from the filter gear teeth to guide the filter gear until it interlocks with the driving gear.

The slip guide may be extended so that the width of both side ends becomes narrower toward the rear.

In addition, the slip guide may include a first inclined portion which is formed on one side surface and a second inclined portion which is formed on the other side surface. Here, the rear end of the slip guide may be curved.

In addition, the driving gear further includes: driving gear teeth; and a coupling boss which protrudes forward from the driving gear teeth and contacts the slip guide.

The coupling boss may extend in a direction facing the slip guide. Here, the front end of the coupling boss may be hemispherical.

Accordingly, the slip guide can guide the coupling boss so as to slide to one side or the other side. As a result, the filter gear or the driving gear can be engaged with each other by the coupling boss being rotated along the guide of the slip guide.

In another point of view, a humidifying air purifier according to an embodiment of the present invention can suggest a structure which can reduce the noise generated in a waterwheel motor which rotates a waterwheel.

The waterwheel motor may generate a large amount of noise even at a relatively low rotational speed using a speed reducer. Accordingly, the humidifying air purifier for reducing such noise includes a body frame which is opened in the front and rear direction, a door assembly which is coupled to the body frame to be capable of being drawn out so as to selectively shield the front surface of the body frame, a housing assembly which has a fan motor for shielding the rear side of the body frame and driving an air blowing fan, an waterwheel motor which is accommodated in the housing assembly, and a motor bracket which fixes the waterwheel motor to the housing assembly.

The motor bracket may include a louver guide which extends outwardly from the peripheral surface, and a louver which has a groove formed along the circumference to be fitted to the louver guide. Accordingly, the louvers can absorb vibration and noise generated by driving the waterwheel motor.

In addition, the housing assembly may include: a fan housing which has a fan intake through which air flows into the center; a housing cover which is coupled to the rear of the fan housing to receive the air blowing fan; and a housing front cover which is coupled to the front of the fan housing to cover the waterwheel motor and the motor bracket.

In addition, the motor bracket may be coupled to the front surface of the fan housing above the fan intake.

The housing front cover may include: a motor case which is formed to be recessed forward from a rear surface to cover the driving gear; and a cutting end which forms an opening in a lower portion of the motor case to expose a portion of the driving gear.

Accordingly, the configurations which are coupled to the waterwheel motor can be shielded by the housing front cover. Therefore, driving noise of the waterwheel motor can be reduced.

The driving gear is disposed in front of the motor bracket and can engage with the waterwheel motor.

In addition, the humidifying air purifier may further include a humidifying filter assembly which has a humidifying filter positioned in front of the housing assembly and a filter gear interlocked with the driving gear.

In addition, the air blowing fan and the fan motor may be coupled to the rear surface of the fan housing so as to correspond to the rear of the fan intake.

In addition, the waterwheel motor may be coupled to the rear center of the motor bracket, and the shaft of the waterwheel motor may extend forward through the motor bracket.

In addition, the driving gear may extend downward to engage with the filter gear. The filter gear may be positioned below the humidifying filter driving gear.

The fan housing may include a motor cover which extends forward from the front surface so as to correspond to a space formed by the cutting end of the motor case.

The motor cover may extend so as to be spaced apart from the rear surface of the motor case.

In addition, the fan housing may include a fastening shaft which protrudes from the front surface. Here, the fastening shaft may be provided to pass through the center of the louver.

In another point of view, a humidifying air purifier according to an embodiment of the present invention can propose a structure which is capable of minimizing air flow interference, flow loss, and flow noise.

Such a humidifying air purifier includes: a cabinet which is provided with a water tub and an air blowing fan; a waterwheel which is submerged in the water storage tub and has a rotatable central shaft; a driving motor which is disposed outside the waterwheel and provides a rotation power to the waterwheel, a fan housing which accommodates the air blowing fan and fixes the driving motor at the rear, a humidifying filter case which shields the front of the driving motor and supports the front surface of the waterwheel, and a shaft support which is coupled to the humidifying filter case and supports a central shaft of the waterwheel.

Accordingly, it is possible to provide a soundproofing structure in which the driving motor is disposed between the air blowing fan for forcing the flow of air and the humidifying filter case for shielding the front of the humidifying filter, thereby minimizing the noise leakage of the driving motor itself.

At the same time, the vibration and vibration noise can be minimized by supporting the waterwheel, which is pushed rearward by the flow of air, from the rear side by the shaft support, when comparing to the related art.

In addition, the humidifying air purifier may further include a driving gear connected to the waterwheel motor and a filter gear interlocked with the driving gear. The filter gear may be provided on the rear of the waterwheel and may extend along an outer frame of the waterwheel.

In addition, the shaft support may form a seating groove on which the central shaft of the waterwheel is seated.

In addition, the shaft support may be integrally coupled with the filter case by a side surface and a bottom surface thereof being formed in a shape corresponding to the side surface and the bottom surface of the filter case.

In another point of view, a humidifying air purifier according to an embodiment of the present invention may propose a structure for facilitating the engagement and detachment of the humidifying filter unit for fixing the humidifying filter.

Such a humidifying air purifier may include a first frame and a second frame for fixing the humidifying filter. The first frame may include a disassembly guide protruding from one surface of the collecting part.

Here, the disassembly guide may move so as to be in contact with the contact line and a pressing protrusion along the rotation. The pressing protrusion may be formed to be inclined along the rotation direction. Accordingly, in a case where the user rotates to disassemble the humidifying filter unit, the disassembly guide can be pressed by the pressing protrusion while rotating along the contact line and separate the first frame and the second frame.

In addition, the second frame may further include an operation rod extending toward the first frame. In addition, the first frame may form an operation hole through which the operation rod penetrates.

Accordingly, the user can easily perform disassembly of the humidifying filter unit by rotating the operating rod.

In addition, the collecting part may include a shielding wall which shields a portion of the flowing groove defined as a space between the first frame and the second frame.

The collecting part may include an upper wall extending from the shielding wall in a rotating direction of the waterwheel.

Accordingly, water can be accommodated into the grooves formed by the shielding wall and the upper wall.

In another point of view, a humidifying air purifier according to the present invention comprises a cabinet which has a space portion; a door assembly which is provided in the cabinet so as to be capable of being drawn into or drawn out to selectively open the space portion; a humidifying filter which absorbs moisture by rotation; a humidifying filter driving gear which is fixed to the cabinet; and a filter gear which is installed in the humidifying filter and interlocks with the humidifying filter driving gear, the rotating direction of the driving gear or the filter gear is perpendicular to the direction into which the door assembly is drawn.

Accordingly, since the assembly includes the door which is slidably drawn out or in the cabinet of the humidifying air purifier, the humidifying filter is accommodated in the door and thus the user can easily access the humidifying filter.

The humidifying air purifier according to the embodiment of the present invention described above has the following effects.

First, a filter and a water container are provided on a door which is drawn into or out to the front or the rear. When the user opens the door, since the user can easily access, the filter and the water container are easily cleaned and replaced.

Second, since the noise generated by the humidifier air purifier is minimized and thus the user's sensual or emotional needs is satisfied, luxurious products can be provided.

Third, there is an advantage that noise between gears coupled or separated in the front and rear direction can be minimized.

Fourth, when the two gears are coupled to be engaged through the movement in the front and rear direction, the accuracy of the coupling can be improved.

Fifth, there is an advantage that the humidifying filter driving gear and the filter gear are stably coupled even if a relatively small force is provided by the user.

Sixth, since the shaft support supports the waterwheel from the rear, it is possible to prevent the waterwheel from being shaken rearward by the pressure due to the air flow. As a result, the vibration of the waterwheel can be minimized, and the noise caused by vibration can be minimized.

Seventh, a water container is mounted on a water tub, and a valve for controlling the water supply of the water container is provided in a space formed by recessing the surface on which the water container is seated, and since the flow direction of water flowing through the valve is bent, the water supply noise can be reduced.

Eighth, the water passing through the valve installed in the water tub flows from the first water storage portion to the second water storage portion whose volume is expanded, so that the water supply noise can be reduced.

Ninth, since a fan housing and a housing cover are provided inside a plurality of outer appearance covers and an air blowing fan is provided inside the fan housing and the housing cover, it is possible to minimize that noise generated in the air blowing fan leaks to the outside.

Tenth, since the guide roller is rotatably provided in correspondence with the rotation of the humidifying filter unit, the friction due to the rotation of the humidifying filter unit can be reduced.

Eleventh, noise generation due to the rotation of the humidifying filter unit can be minimized, thereby improving the quietness.

Twelfth, since the guide roller and the shaft support can stably support the humidifying filter from the front and the rear, there is an advantage that the rotating humidifying filter can be prevented from being inclined. In other words, there is an effect that the balance of the humidifying filter can be maintained.

Thirteenth, the driving stability of the rotating humidifying filter can be secured.

Fourteenth, the user has the advantage of easily and smoothly separating the humidifying filter unit by rotating the operating rod of the humidifying filter unit.

Fifteenth, since the portion shielding the front surface of the humidifying filter is removed, there is an advantage that the intake area for introducing air into the humidifying filter is relatively expanded.

Sixteenth, since the flow rate of the air passing through the humidifying filter can relatively increase, the air purifying and humidifying performance is improved.

Seventeenth, in a case where the engagement direction between the gears is perpendicular to the rotation direction of the gear, the success rate of engagement between the gears can be improved.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s).

Figure 1:
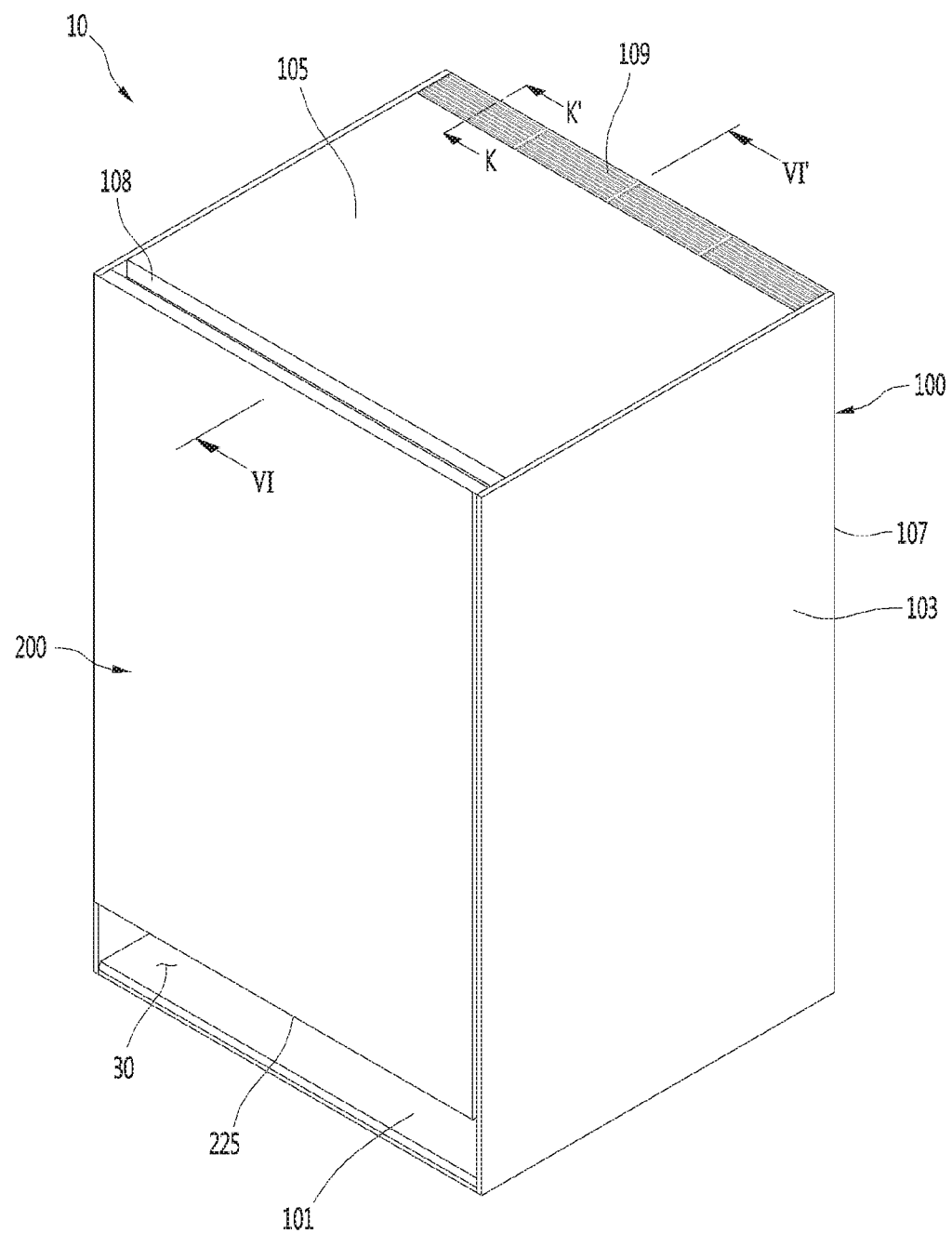
FIG. 1 is a perspective view illustrating a configuration of a humidifying air purifier according to an embodiment of the present invention.
Figure 2:
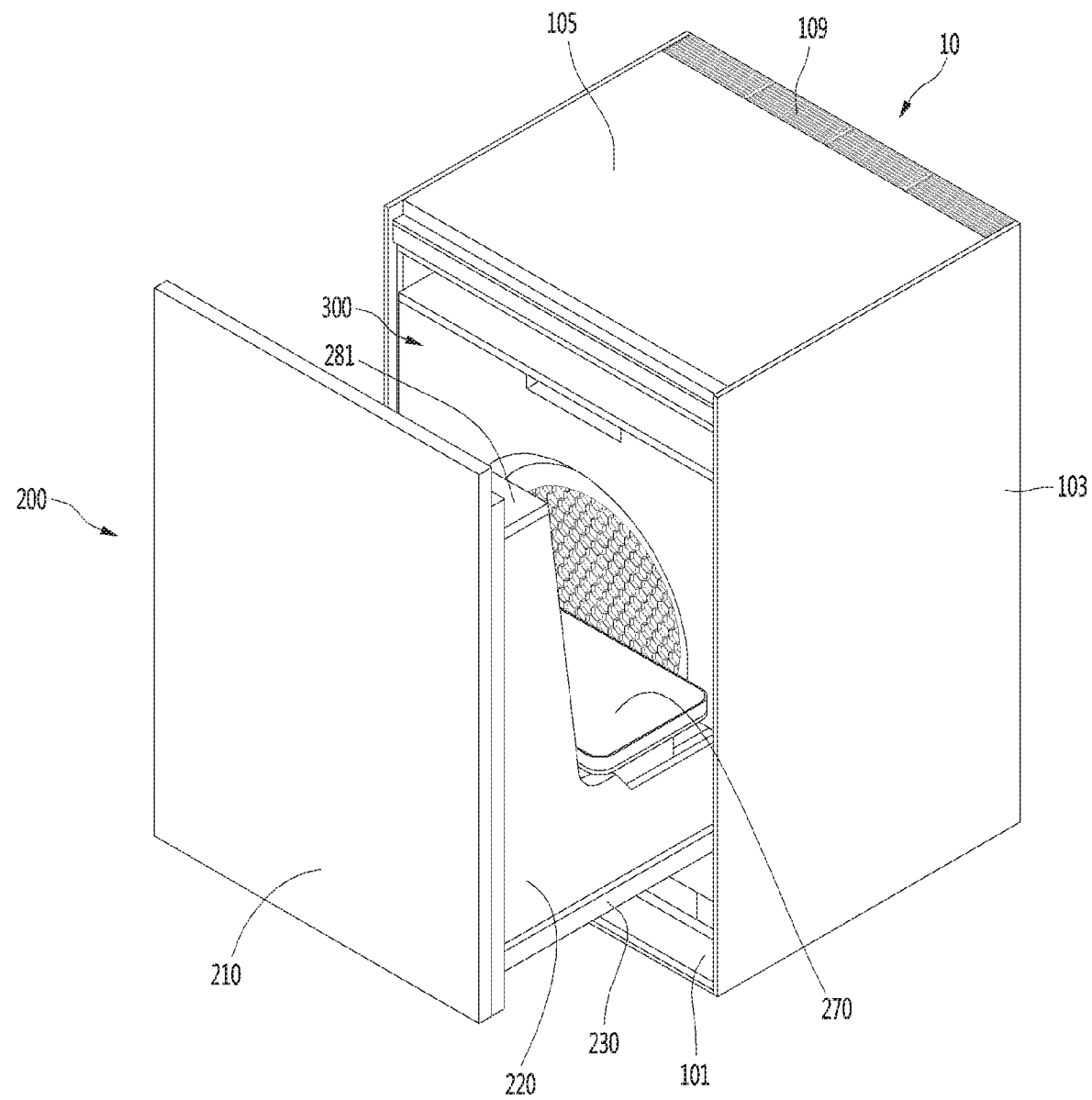
FIG. 2 is a view a state where a door of a humidifying air purifier is opened according to an embodiment of the present invention.
Figure 3:
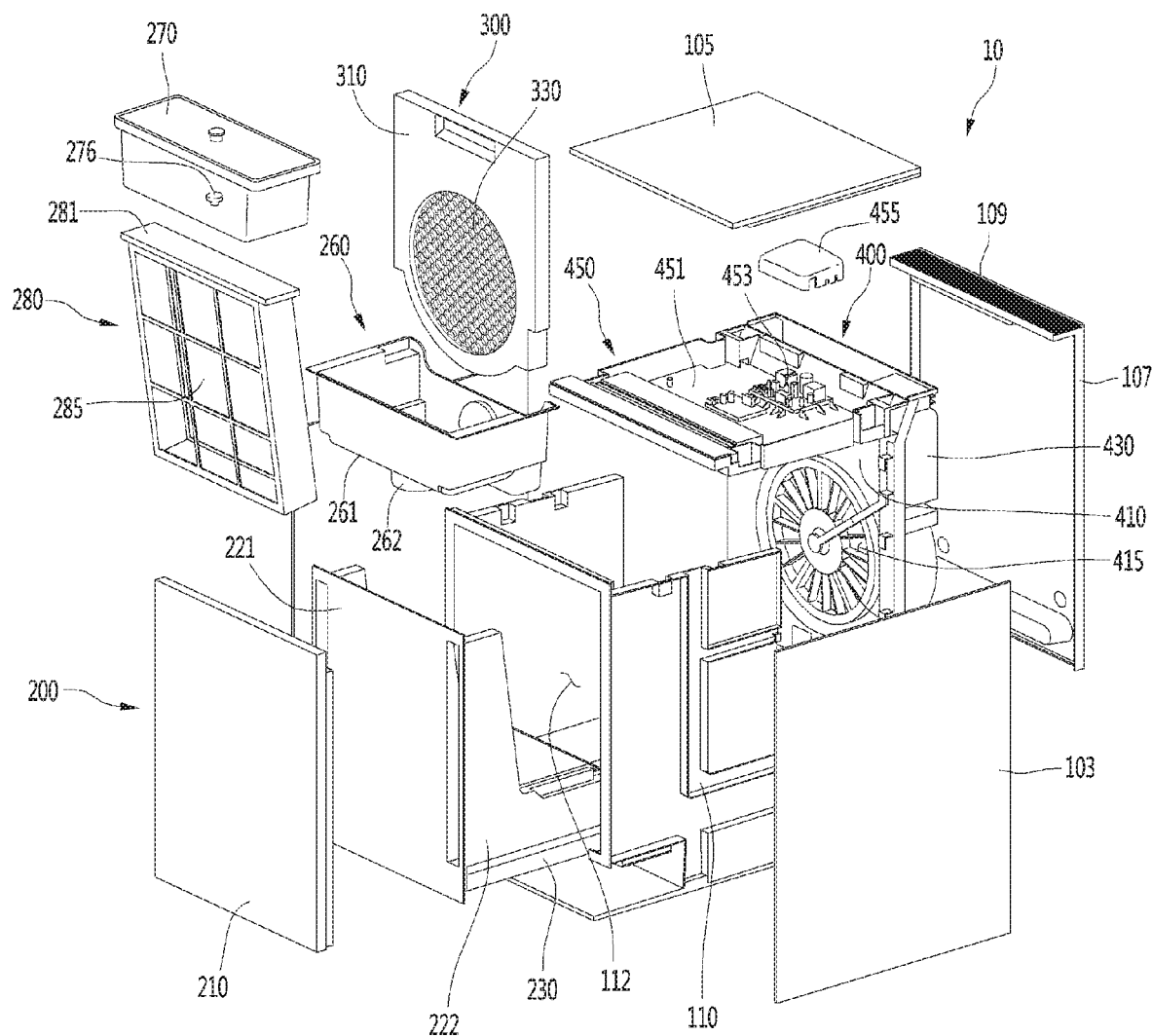
FIG. 3 is an exploded perspective view illustrating a configuration of a humidifying air purifier according to an embodiment of the present invention.
Figure 4:
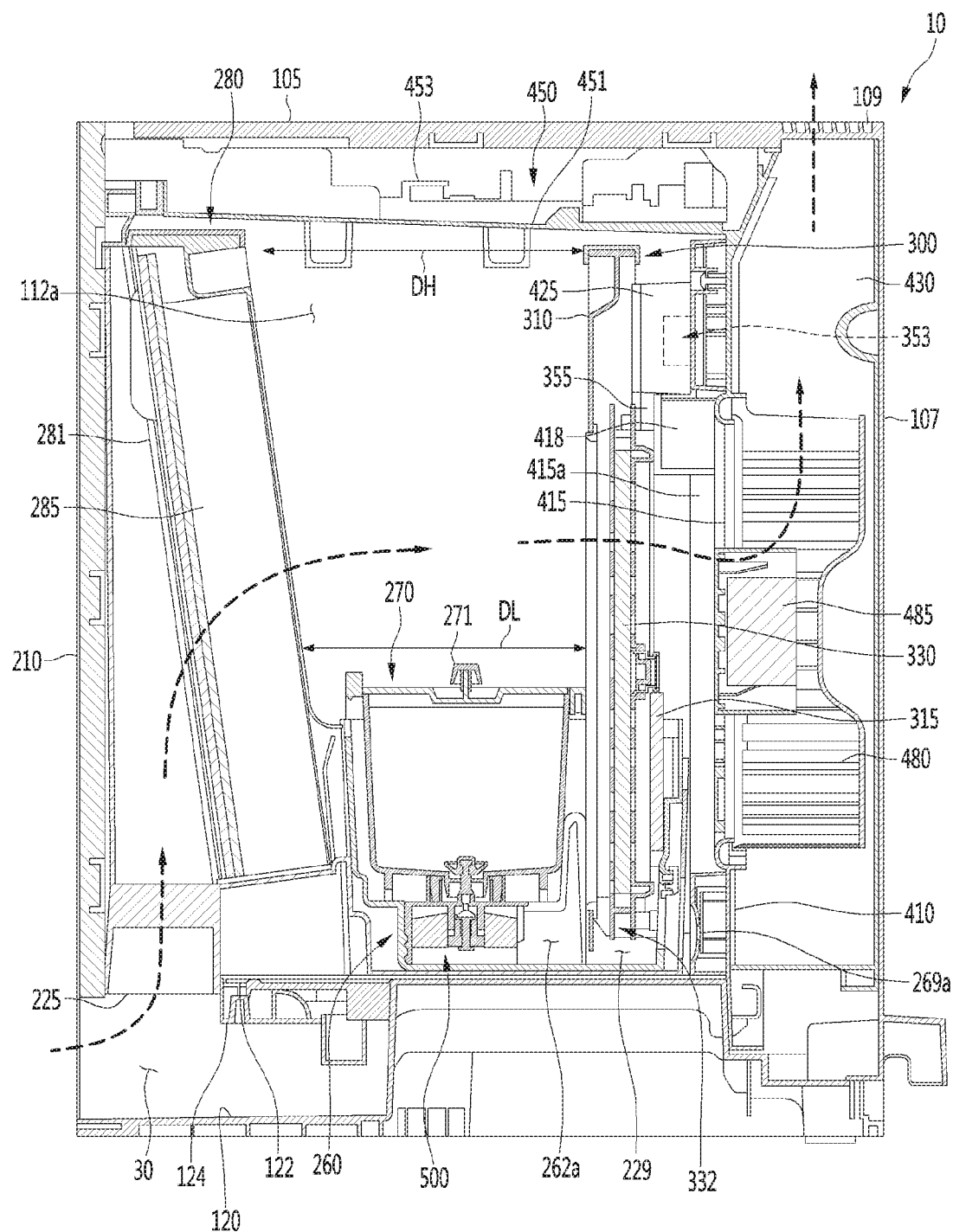
FIG. 4 is a cross-sectional view taken along line VI-VI' of FIG. 1.

FIG. 1 is a perspective view illustrating a configuration of a humidifying air purifier according to an embodiment of the present invention, FIG. 2 is a view illustrating a state where a door of a humidifying air purifier according to an embodiment of the present invention is opened, FIG. 3 is an exploded perspective view illustrating a configuration of a humidifying air purifier according to an embodiment of the present invention, and FIG. 4 is an sectional view taken along line VI-VI' of FIG. 1.

Referring to FIG. 1 to FIG. 4, the humidifying air purifier 10 according to an embodiment of the present invention includes a cabinet 100 forming an outer appearance and a door assembly 200 coupled to the cabinet 100 to be capable of being drawn out.

The cabinet 100 includes a plurality of panels.

In more detail, the plurality of panels includes a lower base 101, two side panels 103 provided on both sides of the lower base 101 and extending upward, an upper panel 105 coupled to an upper side of the side panels 103 on both sides, and a rear panel 107 coupled to the rear side of the side panels 103 on both sides.

By the base 101, the two side panels 103, and the upper panel 105, and the rear panel 107, the cabinet 100 may have the shape of a rectangular parallelepiped having an opened front portion.

The two side panels 103 may be respectively coupled to both side surfaces of a body frame 110 to be described later. In addition, the upper ends of the two side panels 103 may extend upward to be positioned higher than a plate 451 configured for supporting electrical components as described later.

The upper panel 105 can be coupled with the upper ends of the two side panels 103 on the upper side of the plate 451 for supporting electrical components. The front end of the upper panel 105 may be spaced rearward from the upper end of the door assembly 200. A display groove 108 to which a display (not illustrated) is exposed may be formed between the front end of the upper panel 105 and the upper end of the door assembly 200.

The rear panel 107 can be coupled with the rear ends of the two side panels 103.

The plurality of panels may be made of wood material. Therefore, the humidifying air purifier 10 can be given an aesthetical appearance of furniture. In other words, the appearance can be enhanced.

In particular, the upper panel 105 may serve as furniture such as a table, a desk, a bookcase, and the like. For example, the humidifying air purifier 10 may be formed to have a height of less than one meter (1 m) to improve the utilization of the upper panel 105.

According to the present invention, the upper panel 105 can be used as a table, a desk, a bookcase, or the like, and since humidified and purified air is discharged at a position similar to a height of a user in a case where the user is lying on a bed, a more pleasant indoor environment can be obtained.

An air filter assembly 280, a humidifying filter assembly 300, an air blowing fan 480, and the like may be disposed in the internal space of the cabinet 100. Meanwhile, the air filter assembly 280 and the humidifying filter assembly 300 may be collectively referred to as "filter assembly".

The door assembly 200 may be opened by being drawn out to the front of the cabinet 100 or closed by being pushed in toward the rear of the cabinet 100. The door assembly 200 includes a door panel 210 constituting a front surface portion of the air purifier 10. The door panel 210 may be referred to as "a front panel".

The door panel 210 may have a shape of a square plate. In a state where the door assembly 200 is closed, the door panel 210 forms a front surface of an outer appearance of the humidifying air purifier 10. In addition, the door panel 210 is made of wood material so that it can given an aesthetical appearance like furniture.

The door panel 210 may be closed to a position where it forms one flat surface with the upper panel 105 and the front ends of the two side panels 103 in a case where the door assembly 200 is drawn into the cabinet 100.

Accordingly, the cabinet 100 and the door assembly 200 can form a closed structure and can double-seal the internal noise source.

A recessed space 30 is formed between the lower end portion of the door panel 210 and the base 101. An air intake 225 for drawing air into the cabinet 100 is formed above the recessed space 30.

In the upper panel 105 of the cabinet 100, a discharge portion 109 through which filtered and humidified air is discharged is formed. The discharge portion 109 may be positioned on the rear side of the upper panel 105. In other words, the discharge portion 109 may be positioned at the rear upper portion of the humidifying air purifier 10.

Meanwhile, the discharge portion 109 may include an air discharge port which is an opening formed along an upper end of the housing cover 430 and an upper end of the fan housing 410. The air discharge port can be understood as an opening through which the air which has passed through the air blowing fan 480 flows so as to be discharged to the outside.

The door assembly 200 further includes a drawer 220 extending rearward from a rear surface of the door panel 210.

The drawer 220 is provided with components of the humidifying air purifier 10. The components may include an air filter assembly 280, a humidifier filter assembly 300, a water tub 260, and a water container 270.

When the door assembly 200 is drawn out to the front to open the front surface of the cabinet 100, the air filter assembly 280, the humidifying filter assembly 300, and the water container 270 disposed in the drawer 220 can be drawn out forward together. Accordingly, the user can easily access the air filter assembly 280, the humidifying filter assembly 300, and the water container 270.

The drawer 220 may be coupled to the cabinet 100 so as to be drawn out from the cabinet or pushed into the cabinet. Accordingly, the drawer 220 may be referred to as a "door" or "accommodation portion".

The door assembly 200 further includes rail guides 230 for guiding the operation of drawing the door assembly 200 out from the cabinet or pushing the door assembly into the cabinet. The rail guides 230 may be coupled to both sides of the lower portion of the drawer 220.

The door assembly 200 can be drawn out of or pushed into the cabinet 100 through the sliding movement along the rail guide 230. In other words, the door assembly 200 may be provided in a drawer-type to facilitate management of a plurality of components disposed in the drawer 220.

The humidifying air purifier 10 includes an air filter assembly 280 for filtering air, a humidifying filter assembly 300 for humidifying the air, and an air blowing fan 480 for generating an air flow.

In detail, the cabinet 100 includes a body frame 110 forming a space portion 112 in which components of an air purifier are disposed.

A buffer space 112a may be formed in the space portion 112.

The buffer space 112a is a space formed to cause interference so that sound waves generated from an internal noise source of the humidifying air purifier 10 are cancelled from each other.

The internal noise source may include a fan motor 485, a waterwheel motor 353, a waterwheel, an air blowing fan 480, or the like, which can generate driving noise, flow noise, or the like.

In addition, a sound absorbing material for absorbing noise may be provided on an inner surface of the body frame 110 defining both sides and an upper portion of the buffer space 112a.

The buffer space 112a may be defined as a space formed between the air filter assembly 280 and the humidifying filter assembly 300.

For example, the width of the buffer space 112a in the front and rear direction may be defined as a distance between the air filter assembly 280 and the humidifying filter assembly 300. The width of the buffer space 112a in both side directions may be defined as a distance between both side surfaces of the body frame 110. The length of the buffer space 112a in the vertical direction may be defined as the distance from the upper end of the water tub 260 to the plate 451 for supporting electrical components as a length (or height).

The buffer space 112a may have a larger volume toward the upper portion. In other words, the buffer space 112a may be formed such that the distance between the front surface of the humidifying filter assembly 300 and the rear surface of the air filter assembly 280 may be formed so that the upper end DH is larger than the lower end DL thereof.

Accordingly, various sound waves generated due to the driving of the air blowing fan 480, the fan motor 485, the waterwheel, the waterwheel motor 353, or the like cannot escape to the outside by the structure defining the buffer space 112a and can be canceled by interference with each other.

The body frame 110 may have a hexahedron shape in which front, rear, and upper surfaces are opened. In detail, the front surface of the body frame 110 is opened, and the opened front surface can be shielded by the door assembly 200. In addition, the rear surface of the body frame 110 is opened, and the opened rear surface can be shielded by a fan housing 410 and a housing cover 430. In addition, the upper surface of the body frame 110 is opened, and the opened upper surface may be shielded by an electric unit 450.

The two side panels 103 are coupled to both sides of the body frame 110.

The upper panel 105 is coupled to the upper side of the electric unit 450 and the rear panel 107 is coupled to the rear side of the housing cover 430.

The door assembly 200 includes a door panel 210 forming an outer appearance of a front surface and a drawer 220 extending to the rear of the door panel 210.

The drawer 220 includes a door front surface 221 coupled to a rear surface of the door panel 210. The door panel 210 and the door surface 221 may be collectively referred to as "door front surface portion".

The drawer 220 is provided with a door side surface 222 extending rearward from both sides of the door surface 221, a door lower surface provided below the door side surface 222, and a door rear surface extending upward from the rear side of the door lower surface.

The air intake 225 described above may be formed on the lower surface of the door.

An installation space in which the water tub 260, the water container 270, the air filter assembly 280, and the humidifying filter assembly 300 are installed can be defined in the drawer 220 by the door front surface 221, the door lower surface, the door side surface 222, and the door rear surface.

The air filter assembly 280 may be installed in the drawer 220. The air filter assembly 280 may include an air filter case 281 and an air filter 285 coupled to the filter case 281. The air filter assembly 280 may be disposed to be lifted upward and separated.

A water container 270 may be disposed in a substantially central portion of the drawer 220, that is, on the rear side of the air filter assembly 280, with respect to the front and rear direction of the cabinet 100. The water container 270 may be installed inside the water tub 260.

The water container 270 may be disposed so as to be lifted upward and be separated, and a user may separate the water container 270 to replenish water or clean the water container 270.

A valve device 276 for selectively opening and closing a hole through which water is discharged may be installed on the bottom surface of the water container 270.

The valve device 276 can open the hole of the water container 270 when the water container 270 is placed on the water container seating surface 261s of the water tub 260, and operate to close the hole of the water container 270 when the water container 270 is separated from the water container seating surface 261s.

The water tub 260 may have a shape of a polyhedron that is opened upward.

The water tub 260 includes a water tub case 261 formed to receive the water container 270 and the humidifying filter assembly 300.

The water tub case 261 may have a flat one surface therein so that the bottom surface of the water container 270 is seated. In other words, the water tub case 261 may include a water container seating surface 261s (see FIG. 9) which is one flat surface on which the water container 270 is seated.

The water tub 260 further includes a float accommodating portion 262 protruding downward from the water tub case 261 to form an installation space for the float device 500.

In other words, the float accommodating portion 262 may be recessed downward from the center of the water container receiving surface to form a space in which the float device 500 is installed.

The float accommodating portion 262 has a hollow shape in which the inside is hollow, and for example, the float accommodating portion 262 can be positioned at a substantially central portion of the water tub case 261.

The float accommodating portion 262 forms first water storage portions 262a and 263 for storing water and the float device 500 is can be provided movably in the vertical direction along the level of water stored in the first water storage portions 262a and 263.

Meanwhile, the first water storage portions 262a and 263 include a space 262a in which the float device 500 floats in an inner space formed by the float accommodating portion 262.

When the water level of the first water storage portion 262a becomes equal to or higher than the set water level, the float device 500 moves upward to prevent water from flowing into the water container 270.

Meanwhile, the float device 500 may form an outer surface having a radius larger than that of the upper end and the lower end in the central portion. When the water discharged from the water container 270 is discharged downward by gravity, the water can flow in the radial direction while being in contact with the outer surface of the float device 500.

Water radially guided by the contact with the float device 500 flows downward and flows into the first water storage portions 262a and 263. The water flowing into the first water storage portion 262a may flow laterally to fill the second water storage portion 229 together.

Accordingly, since the flow path of the water discharged from the water container 270 is bent a plurality of times at a relatively short distance, water supply noise can be minimized.

In the water tub 260, a second water storage portion 229 extending rearward from the first water storage portion 262a formed by the float accommodating portion 262 may be formed.

The second water storage portion 229 communicates with the first water storage portions 262a and 263 and may form the same water level as the first water storage portions 262a and 263. For example, the first water storage portion 262a may include a rear space 263 extending to flow the water into the second water storage portion 229.

In addition, the second water storage portion 229 may be formed to have a larger volume than the first water storage portions 262a and 263. For example, the second water storage portion 229 may be formed to increase in volume from the rear space 263 of the first water storage portion.

Meanwhile, the first water storage portion 262a and the second water storage portion 229 may be collectively referred to as "water storage portion" or "water storage space" of the water tub 260.

The second water storage portion 229 may be formed at a rear portion of the water tub case 261. The humidification filter assembly 300 may be inserted into the second water storage portion 229. Therefore, the humidifying filter assembly 300 may be disposed at the rear portion of the drawer 220, that is, at the rear side of the water container 270.

The humidifying filter assembly 300 may be positioned to be inserted into the water tub 260. The lower part of the humidifying filter assembly 300 may be disposed to be submerged in the water stored in the second water storage portion 229.

The humidifying filter assembly 300 includes a humidifying filter case 310, a humidifying filter unit 320 rotatably supported by the humidifying filter case 310, and a humidifying filter 330 for absorbing water stored in the water tub 260.

The humidifying filter unit 320 may be disposed so that the center thereof is aligned with the center of the air blowing fan 480. Accordingly, the intake area where the air blowing fan 480 and the humidifying filter 330 are superimposed along the flow direction of the air can be maximized. Therefore, the air passing through the humidifying filter 330 can flow into the air blowing fan 480 with a minimum flow loss.

The humidifying filter assembly 300 further includes a collecting part 332 for scooping up water stored in the second water storage portion 229 of the water tub 260. The collecting part 332 may have a structure capable of holding water along the outer periphery of the humidifying filter unit 320.

A plurality of collecting parts 332 may be provided.

Meanwhile, the humidifying filter 330, the humidifying filter unit 320, and the collecting part 332 can be referred to as a waterwheel since the humidifying filter 330, the humidifying filter unit 320, and the collecting part 332 can rotate to hold the water of the water storage portion. The waterwheel may have a substantially circular shape.

The water scooped up from the collecting part 332 is moved in accordance with the rotation process of the waterwheel, and at this time, can flow down to the humidifying filter 330 sandwiched between the humidifying filter units 320. A detailed description thereof will be given later.

The humidifying air purifier 10 further includes an waterwheel motor 353 for providing a force and a driving gear 355 coupled to the waterwheel motor 353 and rotating, as a driving device for rotating the waterwheel.

The waterwheel motor 353 and the driving gear 355 may be installed on the front surface of the fan housing 410.

In detail, the waterwheel motor 353 and the driving gear 355 may be positioned between the front surface of the fan housing 410 and the rear surface of the humidifying filter case 310.

The waterwheel motor 353 may be positioned outside the fan intake 415 formed at the center of the fan housing 410.

In detail, the waterwheel motor 353 may be positioned farther from the center of the fan intake 415 in the radial direction than the radius of the fan intake 415. For example, the waterwheel motor 353 may be fixed by a motor bracket 354 coupled to an upper portion of the fan housing 410.

The driving gear 355 is positioned in front of the waterwheel motor 353. The driving gear 355 may be connected to the rear of the humidifying filter case 310 to engage with the filter gear 338 coupled to the humidifying filter unit 320.

The outer end portion of the driving gear 355 may be defined as an outermost portion positioned at a position farthest in the radial direction from the center of the driving gear 355.

The outer end portion of the driving gear 355 may be positioned outside the fan intake 415 so as not to obstruct the fan intake 415 for introducing air into the fan 480 from the front.

Here, the outside of the fan intake 415 may be defined as a point positioned at a distance larger than the radius of the fan intake 415 in the radial direction from the center of the fan intake 415.

Meanwhile, the humidifying filter case 310 may form an inner space defined by the upper surface 312 and the side surface 313 of the humidifying filter case 310 rearward. In addition, the waterwheel may be positioned in the internal space of the humidifying filter case 310.

In other words, the waterwheel motor 353 and the driving gear 355 may be positioned below the plate 451 for supporting electrical components and in the internal space of the humidifying filter case 310.

In addition, the waterwheel motor 353 and the driving gear 355 are surrounded by the motor covers 417 and 418 of the fan housing 410, which is positioned below and will be described later, and the housing front cover 420 positioned in front.

Accordingly, the waterwheel motor 353 and the driving gear 355 are positioned in a space where the periphery is shielded. Accordingly, leakage of the noise generated by the waterwheel motor 353 and the driving gear 355 to the outside can be minimized.

In detail, if the waterwheel motor 353 and the driving gear 355 are disposed on the flow path connected to the discharge portion 109 by being accommodated in the fan housing 410 and the housing cover 430, the driving noise can be leaked to the outside through the discharge portion 109.

However, the waterwheel motor 353 and the driving gear 355 according to the embodiment of the present invention can relatively improve the quietness by the configuration described above.

As described above, the humidifying filter assembly 300 includes a filter gear 338 interlocked with the driving gear 355.

The filter gear 338 may be positioned behind the humidifying filter 330. The filter gear 338 can be coupled with the driving gear 355 by gear-tooth coupling. For example, the filter gear 338 may be coupled to the outer surface of the humidifying filter unit 320.

When the waterwheel motor 353 is driven, the filter gear 338 can rotate clockwise or counter-clockwise interlocking with the driving gear 355. Accordingly, along with the rotation of the filter gear 338, the humidifying filter unit 320 and the humidifying filter 330 can rotate together.

The waterwheel can be rotated by receiving the power of the waterwheel motor 353. Accordingly, the water collected by the collecting part 332 is moved along the circumferential direction by the rotation of the waterwheel. The water in the collecting part 332 falls into the humidifying filter 330 by gravity when the collecting part 332 is positioned above the humidifying filter 330 to be capable of wetting the humidifying filter 330.

The humidifying filter 330 may be made of cloth, felt, or sponge material which is easy to absorb water.

A sterilizing device (not illustrated) for irradiating light toward the inside of the water tub 260 may be disposed on the rear side of the water tub 260 to sterilize the water stored in the water tub 260. For example, the sterilizing device may include an ultraviolet LED.

A hole 260h (see FIG. 10) may be formed on the rear side of the water tub 260 so that light is emitted from the sterilizing device into the water tub 260.

The sterilizing device can sterilize water by irradiating light to the second water storage portion 229. In addition, an incision portion 315b (see FIG. 11) may be formed in the humidifying filter assembly 300 so that the light is efficiently irradiated by the sterilizing device installed in the hole 260h of the water tub 260.

The humidifying air purifier 10 further includes a housing assembly 400 disposed inside the cabinet 100.

The housing assembly 400 includes an air blowing fan 480 for generating an air flow, a fan housing 410 positioned in front of the air blowing fan 480, and a housing cover 410 positioned behind the air blowing fan 480.

The fan housing 410 and the housing cover 430 may receive the air blowing fan 480. In other words, the fan housing 410 and the housing cover 430 may be provided to surround the air blowing fan 480.

The air blowing fan 480 may be coupled to a fan motor 485 coupled to the fan housing 410. The fan motor 485 may provide a force to rotate the air blowing fan 480.

The housing assembly 400 may further include a housing front cover 420 covering a front surface of the fan housing 410. A detailed description thereof will be described later.

The housing assembly 400 may be disposed on the rear side of the door assembly 200.

The air blowing fan 480 includes a centrifugal fan that sucks air in the direction of the rotation central axis and discharges the air in a radial direction. For example, the centrifugal fan may include a sirocco fan. Here, the direction of the rotation central axis of the air blowing fan 480 may be the same as the front and rear direction of the cabinet 100.

The humidifying air purifier 10 further includes an electric portion 450 having a plurality of electric components 453.

The electric portion 450 includes a plate 451 for supporting electrical components covering an opened upper surface of the body frame 110. The plate 451 for supporting electrical components may be formed integrally with the fan housing 410. For example, the plate 451 for supporting electrical components may extend forward from the upper end of the fan housing 410.

The plurality of electric components 453 may be installed on the upper surface of the plate 451 for supporting electrical components. The electric portion 450 may further include an electric cover 455 for shielding at least a portion of the plurality of electrical components 453.

The plate 451 for supporting electrical components may extend forward from the upper portion of the housing assembly 400.

The upper panel 105 is coupled to the upper side of the plate 451 for supporting electrical components to protect the electric component 453.

A sliding rail (not illustrated) may be installed inside the body frame 110. The sliding rail may be coupled to the rail guide 230 so as to be movable in the front and rear direction. For example, the sliding rail may be provided in a pair with the rail guide.

The sliding rails may be disposed on both sides of the lower portion of the body frame 110. The rail guide 230 provided on the door assembly 200 may slide forward and rearward along the rail assembly.

The sliding rail and the rail guide 230 may be referred to as a rail assembly. The rail assembly can guide the operation of drawing out or into the door assembly 200 from the opened surface of the cabinet 100.

An illumination bracket (not illustrated) in which an illumination device (not illustrated) is installed is further provided under the body frame 110.

The illumination bracket may be disposed on the upper side of the base 101.

The illumination device includes an illumination PCB 122 having an illumination source and an illumination case 124 coupled to the illumination PCB 122. A plurality of the illumination sources may be provided.

A reflection plate 120 may be provided on the upper surface of the base 101. The reflection plate 120 may be provided to gently reflect or diffuse the light emitted from the illumination source.

The air flow in the humidifying air purifier according to the embodiment of the present invention will be schematically described.

When the fan motor 485 and the air blowing fan 480 connected to the fan motor 485 are driven, the air outside the humidifying air purifier 10 may be sucked into the air intake 225 via the recessed space 30. The air drawn in through the air intake 225 flows upward and flows into the drawer 220.

The air passes through the air filter assembly 280. The air filter assembly 280 may be disposed obliquely forward. Therefore, the air can evenly pass through the front surface of the air filter 285 provided in the air filter assembly 280.

The air filtered in the air filter assembly 280 flows rearward and can pass through the humidifying filter assembly 300. The air is humidified while passing through the humidifying filter assembly 300, and the humidified air can pass through the air blowing fan 480.

The air filter assembly 280, the water tub 260, and the humidifying filter assembly 300 may be disposed in order from a front of the cabinet 100 in the inside of the drawer 220 toward the rear of the cabinet 100. Therefore, air filtering and humidification can be easily performed.

Meanwhile, the air drawn in the direction of the rotation central axis of the air blowing fan 480 can be radially discharged. The air which has passed through the air blowing fan 480 flows upward and can be discharged to the outside through the discharge portion 109.

Figure 5:
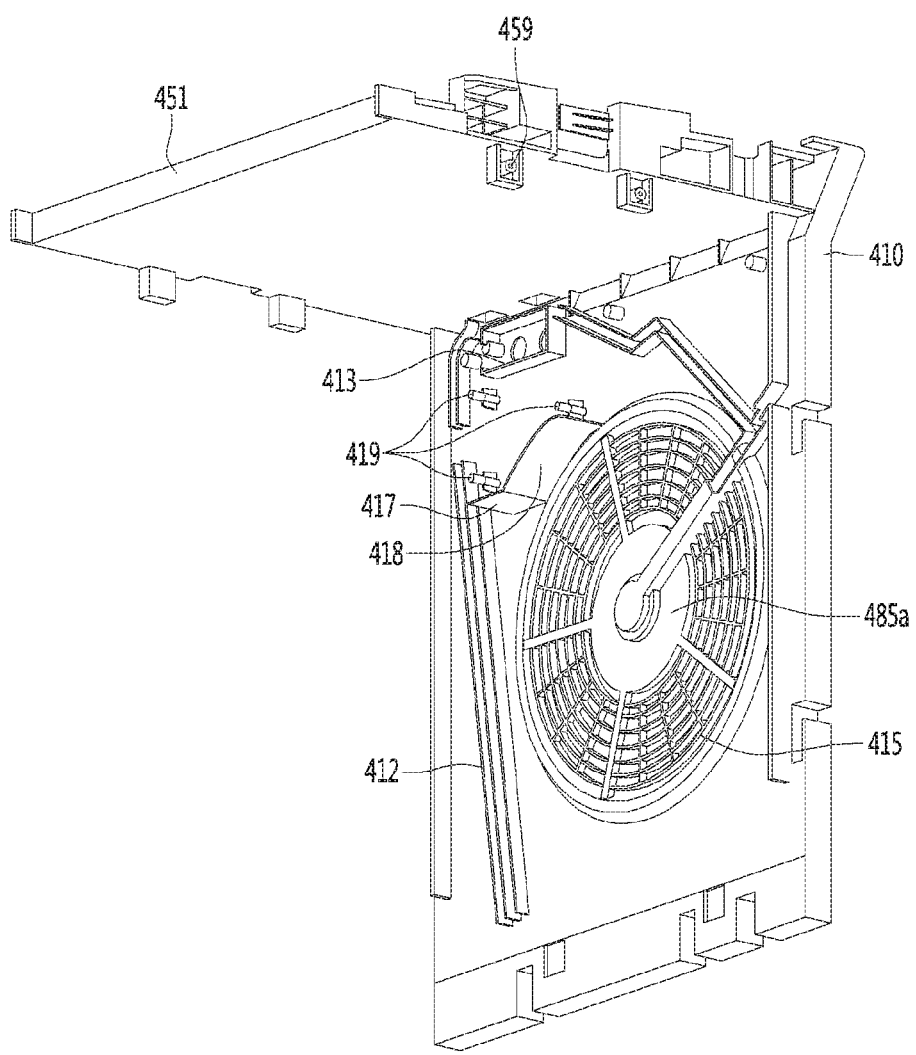
FIG. 5 is a perspective view illustrating a fan housing and an electric plate according to an embodiment of the present invention.
Figure 6:
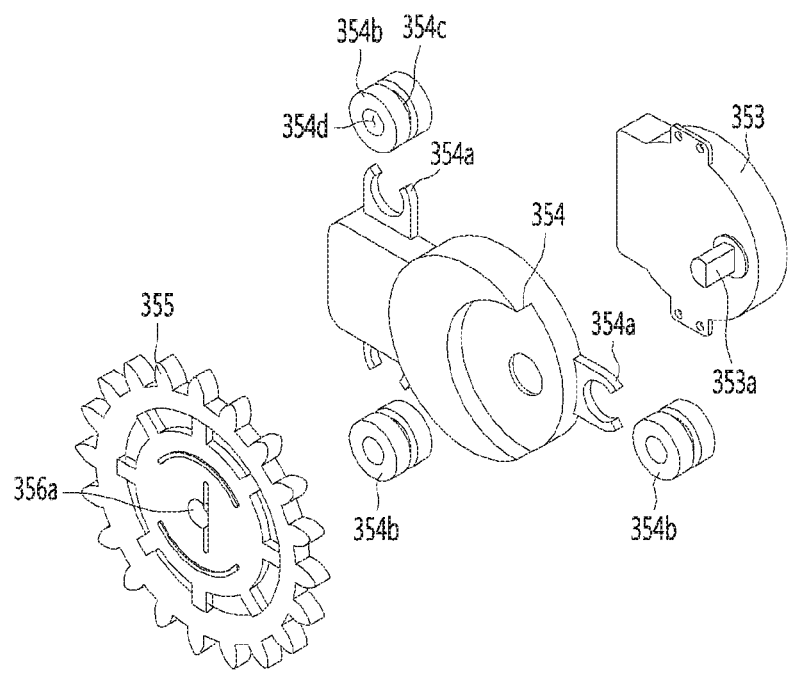
FIG. 6 is an exploded perspective view illustrating a humidifying filter motor, a motor bracket, and a humidifying filter driving gear according to an embodiment of the present invention.
Figure 7:
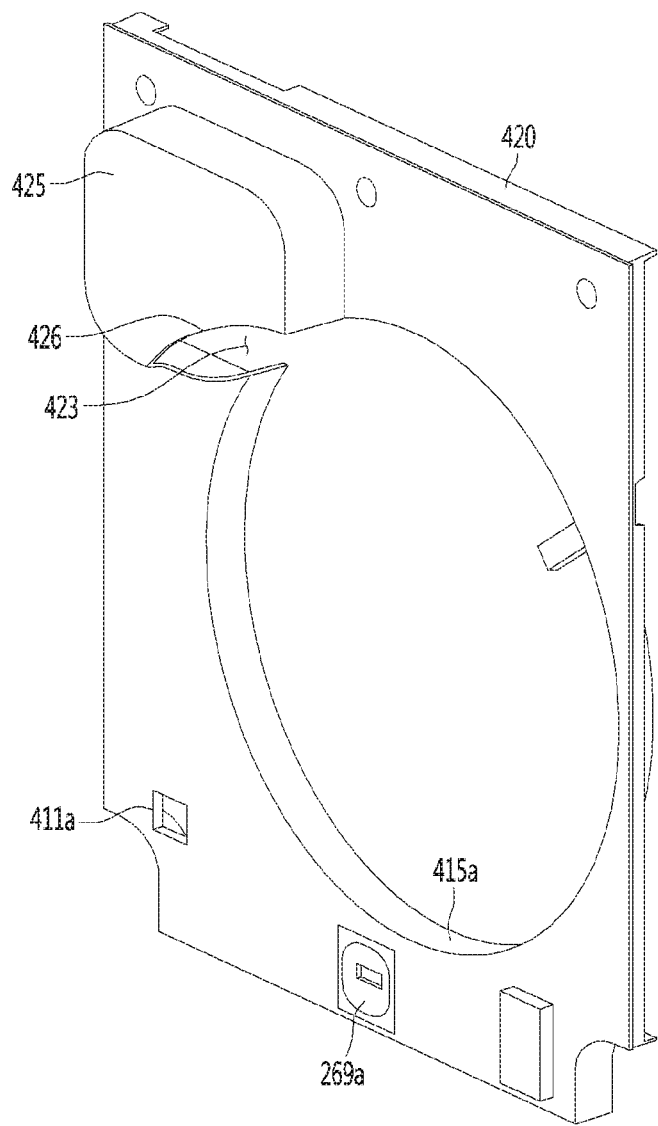
FIG. 7 is a perspective view illustrating a housing front cover according to an embodiment of the present invention
Figure 8:
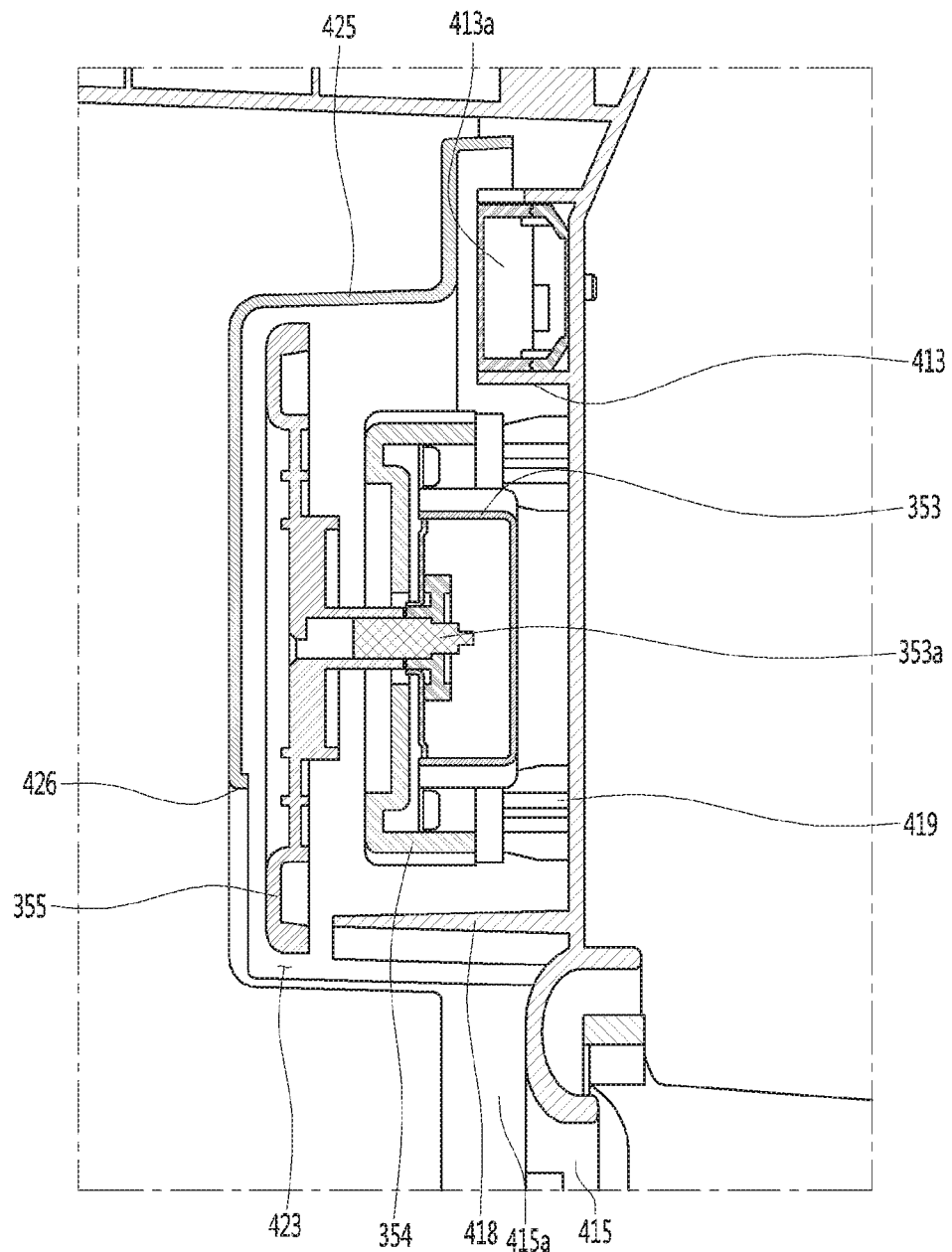
FIG. 8 is an enlarged cross-sectional view taken along line K-K' in FIG. 1.

FIG. 5 is a perspective view illustrating the fan housing and the plate 451 for supporting electrical components according to an embodiment of the present invention, FIG. 6 is an exploded perspective view illustrating a humidifying filter motor, a motor bracket, and a humidifying filter driving gear according to an embodiment of the present invention, FIG. 7 is a perspective view illustrating a housing front cover according to an embodiment of the present invention, and FIG. 8 is an enlarged sectional view taken along line K-K' in FIG. 1.

Referring to FIG. 5 to FIG. 8, the fan housing 410 includes a fan intake 415, which is an opening through which air flows into the center of the fan housing 410.

The fan intake 415 may include a fan motor accommodating body 485*a* surrounding the fan motor 485 at the center thereof and a intake guide rib extending radially or circumferentially from the fan motor accommodating body 485*a*.

The fan motor accommodating body 485*a* may extend rearward from the center of the fan intake 415. For example, the fan motor accommodating body 485*a* may be formed in a bowl shape.

The fan motor 485 may be installed in the fan motor accommodating body 485*a*. In other words, the fan motor 485 can be coupled to the rear surface of the fan housing 410. Accordingly, the fan motor 485 may be positioned at the center of the fan intake 415. As a result, the fan motor 485 and the air blowing fan 480 coupled to the fan motor 485 may be positioned at the center of the fan intake 415.

The intake guide rib can prevent the user's hands from being input into air blowing fan 480.

The plate 451 for supporting electrical components may be coupled to the upper end of the fan housing 410. For example, the plate 451 for supporting electrical components may obliquely extend forward at an upper end of the fan housing 410 forward. In this case, the full length plate 451 may form an integral portion of the fan housing 410.

On both ends of the plate 451 for supporting electrical components, a fastening protrusion 459 extending downward may be formed. The fastening protrusions 459 may be provided to be fastened to both side surfaces of the body frame 110.

The fan housing 410 may be provided with an ionizer 413*a* functioning to remove impurities from the air flowing into the discharge portion 109.

In other words, the fan housing 410 may further include an ionizer rib 413 for guiding the ionizer 413*a* to be coupled thereto.

The ionizer ribs 413 extend forward from the front surface of the fan housing 410 and surround the outer surface of the ionizer 413*a*.

In addition, the front surface of the fan housing 410 may form a hole inside the ionizer ribs 413. The ionizer 413 may provide ions to the air flowing through the air blowing fan 480 and flowing to the discharge portion 109.

The fan housing 410 further includes a harness rib 412 into which electric wires for supplying power to the waterwheel motor 353 are inserted, the ionizer 413*a*, the fan motor 485, or the like.

The harness ribs 412 protrude forward from the front surface of the fan housing 410, and the electric wires may be inserted between the harness ribs 412.

In addition, the fan housing 410 may further include motor covers 417 and 418 positioned outside the fan intake 415.

As described above, the outside of the fan intake 415 may be defined as a point positioned at a distance larger than the radius of the fan intake 415 in the radial direction from the center of the fan intake 415.

In other words, the motor covers 417 and 418 may shield the down portion of the waterwheel motor 353 from the outside of the fan intake 415.

In detail, the motor covers 417 and 418 may include a first motor cover 417 extending in a straight line and a second motor cover 418 extending arcuately from the first motor cover 417.

The first motor cover 417 may be formed by a plate extending forward from the front surface of the fan housing 410. For example, the first motor cover 417 may form a plane extending vertically from the front surface of the fan housing 410.

The first motor cover 417 may be positioned outside the fan intake 415.

In addition, the first motor cover 417 may be positioned below the waterwheel motor 353 and the motor bracket 354 for fixing the waterwheel motor 353.

The second motor cover 418 may extend obliquely from one end of the first motor cover 417. In other words, the second motor cover 418 may be formed to extend forward from the front surface of the fan housing 410.

The second motor cover 418 may extend along the outer periphery (circumference) of the fan intake 415. For example, the second motor cover 418 may be rounded to correspond to the curvature of the outer periphery of the fan intake 415.

According to the motor covers 417 and 418, in a case where the door assembly 200 is drawn out, the access of the user's hand to the waterwheel motor 353 and the motor bracket 354 can be blocked.

In addition, the motor covers 417 and 418 shield the waterwheel motor 353 and the motor bracket 354 from below to prevent driving noise from leaking to the outside through the fan intake 415.

In addition, the motor covers 417 and 418 may be formed so as to correspond to the incision space 423 defined by the cutting end 426 of the motor case 425 to be described later.

The fan housing 410 may further include a fastening shaft 419 for coupling the waterwheel motor 353.

The fastening shaft 419 may extend forward from the front surface of the fan housing 410. For example, the fastening shaft 419 may be formed in a cylindrical shape with a circle having a predetermined diameter extending forwardly.

A plurality of fastening shafts 419 may be formed. In this case, the louvers 354b to be described later may be provided in a number corresponding to the number of the fastening shafts 419.

In addition, the fastening shaft 419 may be positioned above the motor covers 417 and 418.

As described above, the humidifying air purifier 10 further includes a motor bracket 354 coupling the waterwheel motor 353 to the fan housing 410.

The waterwheel motor 353 can be coupled to the front surface of the fan housing 410 by the motor bracket 410. For example, the fastening shaft 419 can be inserted into the outer surface of the motor bracket 410.

The motor bracket 410 may be positioned outside the fan intake 415. For example, the motor bracket 410 can be coupled to the front surface of the fan housing 410 above the fan intake 415.

The waterwheel motor 353 may be coupled to the rear surface of the motor bracket 354. The motor bracket 354 may form a hole at the center so that the shaft 353a of the waterwheel motor 353 passes through the motor bracket 354.

The shaft 353a of the waterwheel motor 353 penetrating forward of the motor bracket 354 may be coupled to the motor shaft coupling hole 356a of the driving gear 355.

In other words, the waterwheel motor 353 is positioned behind the motor bracket 354, and the driving gear 355 can be positioned in front of the motor bracket 354.

The motor bracket 354 may include a louver guide 354a protruding outward along the outer surface.

The louver guide 354a may protrude from the outer surface of the motor bracket 354 in the radial direction of the motor bracket 354. In addition, the louver guide 354a may be extended to be recessed inwardly in a rounded shape. For example, the louver guide 354a may be formed in a 'C' shape opened to one side.

The louver guide 354a can be coupled with the fastening shaft 419 of the fan housing 410. For example, the fastening shaft 419 can be coupled to a space recessed inside the louver guide 354a.

In more detail, the motor bracket 354 may further include a louver 354b that couples with the fastening shaft 419.

The louver 354b can be fitted to the louver guide 354a. For example, the louver 354b may form a louver groove 354c recessed toward the center along the peripheral surface.

The louver groove 354c may be inserted into a space recessed inward of the louver guide 354a and may be fitted in the louver guide 354a.

The louver 354b may form a louver hole 354d through which the fastening shaft 419 passes. The louver hole 354d may be formed so that the fastening shaft 419 can pass through in the front and rear direction.

In other words, the fastening shaft 419 may be inserted into and passes through the louver hole 354d and may be coupled with the louver 354b.

The outer surface of the louver 354b is fitted to the louver guide 354a so that the motor bracket 354 can fix the waterwheel motor 353 to the front surface of the fan housing 410.

The louvers 354b may be formed of a material having elasticity. Therefore, the louver 354b can absorb vibration due to the operation of the waterwheel motor 353. As a result, the vibration generated by the operation of the waterwheel motor 353 is absorbed by the louver 354b, and thus the problem that the vibration is transmitted to the fan housing 410 can be prevented.

In other words, according to the configuration of the motor bracket 354, vibration and noise of the waterwheel motor 353 can be reduced.

Meanwhile, the fan motor 485, which provides the driving force to the air blowing fan 480, may be referred to as a first motor, and the waterwheel motor 353, which provides a driving force to the waterwheel, may be referred to as a second motor.

As described above, the housing assembly 400 may further include a housing front cover 420 covering a front surface of the fan housing 410.

The housing front cover 420 may be coupled to the fan housing 410 to cover the waterwheel motor 353 and the motor bracket 354 from the front.

In other words, the housing front cover 420 may be positioned in front of the fan housing 410.

Meanwhile, the housing cover 430 may be referred to as a first cover because the housing cover is coupled to the rear of the fan housing 410 and the housing front cover 420 may be referred to as a second cover because the housing front cover is coupled to the front of the fan housing 410.

The housing front cover 420 may form a cover opening 415a which is opened at an area corresponding to the fan intake 415 at the center.

The cover opening 415a may be positioned in front of the fan intake 415. The cover opening 415a may be contacted along the periphery of the fan intake 415. For example, the cover opening 415a may be provided in a form of a circle which contacts the periphery of the fan intake 415.

Meanwhile, an incision portion cut by a predetermined arc length can be formed at one upper end of the cover opening 415a. In other words, the incision portion of the cover opening 415a may form a space that is spaced apart in the circumferential direction. In addition, the cutting end 426 of the motor case 425, which will be described later, may be formed to extend forward from the incision portion.

The housing front cover 420 may further include a motor case 425 which is recessed forward.

The motor case 425 may be formed on one side of the housing front cover 420. For example, the motor case 425 may be recessed forward from the rear surface of the housing front cover 420.

The motor case 425 may be recessed to correspond to a position where the waterwheel motor 353, the motor bracket 354, and the driving gear 355 are disposed. For example, the motor case 425 may protrude from the front surface of the housing front cover 420 in a form of a bowl.

In other words, the waterwheel motor 353, the motor bracket 354, and the driving gear 355 may be positioned in the recessed space of the motor case 425. The motor case 425 may shield the waterwheel motor 353, the motor bracket 354, and the driving gear 355 from the front.

The motor case 425 may be formed with an cutting end 426 forming a space 423 communicating with the incision portion of the cover opening 415*a*. In other words, the cutting end 426 may form an opening in the lower portion of the motor case 425.

The cutting end 426 may be formed such that the lower end of the front surface of the motor case 425 is opened to be rounded forward.

In addition, the cutting end 426 may open one side surface of the motor case 425 downward or in a direction of the cover opening 415*a* so as to correspond to the cutting portion of the cover opening 415*a*.

In other words, the cutting end 426 extends forward from one point of the incision portion of the cover opening 415*a* and extends outwardly and arcuately to draw a curve at the point.

In other words, in the lower portion of the motor case 425, a space 423 opened frontward and downward by the cutting end 426 may be defined.

A portion of the space 423 can be shielded by the motor covers 417 and 418 described above. In other words, the cutting end 426 may define a space 423 in which the motor covers 418 and 419 are disposed.

In other words, in a case where the housing front cover 420 is coupled to the fan housing 410, the motor covers 417 and 418 may be disposed on the opened lower surface of the motor case 425.

Here, the motor covers 417 and 418 and the motor case 425 may define a space therebetween (see FIG. 8).

In detail, the motor cover 417 and 418 may extend forward to a point spaced from the cutting end 426 of the motor case 425. Therefore, the front ends of the motor covers 417 and 418 may be spaced rearward from the rear surface of the motor case 425.

The space between the motor covers 417 and 418 and the motor case 425 may be defined as an exposure space through which the driving gear 355 is exposed.

In other words, the space 423 may include an exposure space for engaging the lower portion of the driving gear 355 with the filter gear 338 installed in the waterwheel. Therefore, the driving gear 355 can rotate in a state of being engaged with the filter gear 338 without interfering with the motor case 425.

In addition, the housing front cover 420 may be formed with a contact hole 411*a* for selectively connecting power to the door assembly 200 through contact with the rear end of the door assembly 200 in a case where the door assembly 200 is completely pushed into the cabinet 100.

The contact hole 411*a* may be formed at the lower front surface of the housing front cover 420. A switch for performing electrical connection to a position corresponding to the contact hole 411*a* may be provided on the front surface of the fan housing 410.

In addition, the housing front cover 420 may further include a sterilizing device connector 269*a* for connecting a power source of the sterilizing device described above.

The sterilizing device connector 269*a* may be positioned at the lower end center of the housing front cover 420. In addition, the sterilizer device connector 269*a* may be recessed rearwardly to engage the rear end of the sterilizing device.

Figure 9:
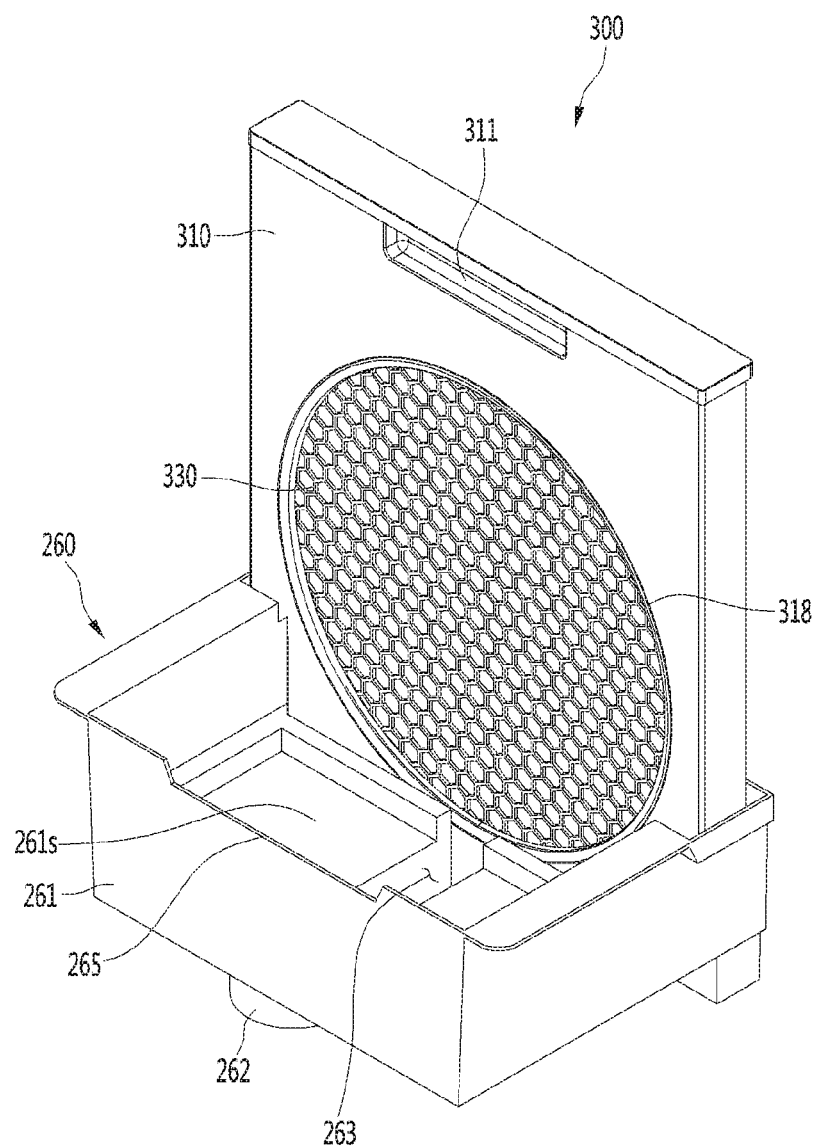
FIG. 9 is a perspective view illustrating a coupling state of a humidifier filter assembly and a water tub according to an embodiment of the present invention.
Figure 10:
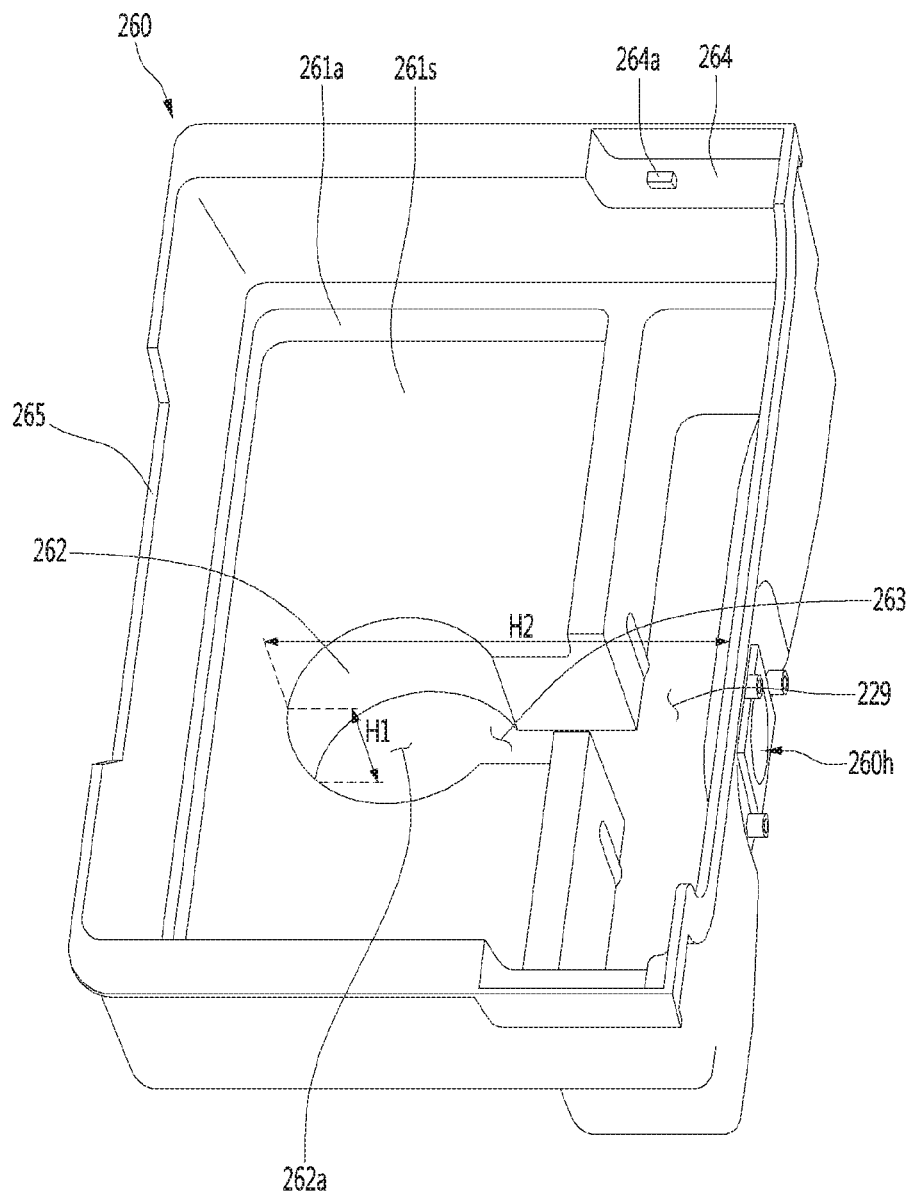
FIG. 10 is a perspective view illustrating a water tub according to an embodiment of the present invention.

FIG. 9 is a perspective view illustrating a combination state of a humidifier filter assembly and a water tub according to an embodiment of the present invention, and FIG. 10 is a perspective view illustrating a water tub according to an embodiment of the present invention.

Referring to FIG. 9 and FIG. 10, the humidifying filter assembly 300 may be positioned behind the water container seating surface 261*s* on which the water container 270 is seated in the water tub. The humidifying filter assembly 300 may be inserted into the water tub 260 such that the lower portion thereof is submerged in the second water storage portion 229.

The humidifying filter assembly 300 includes a humidifying filter case 310.

A handle portion 311 is formed in the humidifying filter case 310. In detail, the handle portion 311 may be formed on the upper portion of the humidifying filter case 310 so that the user's hand can easily grasp the upper portion of the humidifying filter case 310. For example, the handle portion 311 may be formed by recessing or opening a portion of the front surface of the humidifying filter case 310 rearward.

Accordingly, the user can easily grasp the humidifying filter assembly 300 by inserting his/her hand into the space formed by the handle portion 311. Therefore, the humidifying filter assembly 300 can be easily separated or inserted into the water tub 260.

In addition, an intake opening 318 is formed in the humidifying filter case 310 so as to open in the front and rear direction so that air can flow into the humidifying filter 330.

The intake opening 318 may be formed to correspond to the front of the humidifying filter 330 at the center of the humidifying filter case 310. For example, the intake opening 318 may be formed to have a radius equal to or greater than the radius of the humidifying filter 330.

The center of the intake opening 318 may be positioned on a straight line with the center of the humidifying filter 330. Accordingly, the air flowing into the intake opening 318 can pass through the humidifying filter 330.

The humidifying filter case 310 may include a supporting protrusion 318*a* for supporting a front surface of the humidification filter unit 320.

The supporting protrusion 318*a* may be formed to protrude rearward from the rear surface of the humidifying filter case 310. For example, the support protrusion 318*a* may extend to contact the lower surface of the front surface of the humidifying filter unit 310. The extending end portion of the support protrusion 318*a* may be formed as a blunt curved surface so as to stably support the rotating humidifying filter unit 320.

The supporting protrusion 318*a* may be positioned below the rear surface of the humidifying filter case 310. For example, the support protrusion 318*a* may be positioned so as to be spaced apart to the upper side of the lowermost end 316*a* of the humidifying filter case. The support protrusion 318*a* may be positioned to be in contact with the lower front end of the first outer frame 321*b*, which will be described later.

As described above, the water tub 260 includes a water tub case 261 which forms an outer appearance to receive the water container 270.

The water tub case 261 may further include a engaging portion 264 on which the humidifying filter case 310 is mounted.

The engaging portion 264 can guide the humidifying filter assembly 300 to be easily inserted into the second water storage portion 229.

The engaging portion 264 may be formed to be symmetrical to both upper ends of the water tub case 261. The engaging portion 264 may be formed in a shape corresponding to both side surfaces of the humidifying filter case 310.

For example, when the stepped portion 314 of the humidifying filter case 310 is formed in a "⌐" shape, the engaging portion 264 may be recessed in an '⌐' shape. In other words, the engaging portion 264 may be formed in a shape conforming to the shape of the step portion 314.

The engaging portion 264 may form a stepped protrusion 264a inserted into a groove formed in a stepped portion 314 of the humidifying filter case 310. For example, the stepped protrusion 264a may protrude upward from the engaging portion 264.

The lowest point 310a of the humidifying filter case 310 may be spaced upward from the bottom surface of the water tub case 261 forming the second water storage portion 229.

In other words, the height of the engaging portion 264 may be higher than the vertical distance from the lowest point 310a of the humidifying filter case 310 to the stepped portion 314. Accordingly, the lowest point 310a of the humidifying filter case 310 may be positioned higher than the bottom surface of the second water storage portion 229.

Meanwhile, a water container seating surface 261s on which the bottom surface of the water container 270 is mounted may be formed in the water tub case 261. The water container seating surface 261s may be formed as a flat surface.

The water container seating surface 261s can be formed at a higher position than the water storage portions 262a and 229.

The water tub case 261 may further include a seating end 261a that extends upward along the periphery of the water container seating surface 261s and forms a step with the water container seating surface 261s.

The seating end 261a is brought into contact with a lower periphery of the water container 270 to stably fix the water container 270.

The water container seating surface 261s may be formed at a position higher than the bottom surface of the water tub case 261 defining the second water storage portion 229.

In detail, the water tub 260 may further include a float accommodating portion 262 that is downwardly recessed from a center of the water container seating surface 261s. The float device 500 described above may be installed in the float accommodating portion 262.

The float device 500 may have an outer surface which is formed such that the radius thereof is relatively expanded. The outer surface of the float device 500 can guide the flow direction of the falling water in the radial direction when the valve device 276 opens a hole formed in the bottom surface of the water container 270.

The float accommodating portion 262 can form a water storage space in which water is stored. The first water storage portions 262a and 263 can be understood as a water storage space formed by the float accommodating portion 262. Accordingly, it is possible to reduce water supply noise generated while water falls.

The second storage unit 229 can be understood as a storage space extending rearward from the first storage units 262a and 263.

As described above, the first water storage portions 262a and 263 and the second water storage portion 229 may be collectively referred to as "water storage portion".

The maximum height H1 of the water storage portion may be smaller than the maximum width H2 thereof. Accordingly, while the water storage capacity of the water storage portion is secured at an appropriate level, the falling distance of the water falling downward from the water container 270 can be relatively minimized. Therefore, water supply noise can be minimized.

The maximum height of the water storage portion is equal to the maximum height of the first bottom portions 262a and 263. The maximum height H1 of the first water storage portion 262a may be defined as a vertical distance from the bottom surface of the water tub case 261 defining the bottom of the first water storage portion 262a to the water container seating surface 261s.

In other words, the maximum height H1 of the first water storage portion 260 may be defined as a length of a perpendicular line drawn from the lowermost point of the water tub 260 to the water container seating surface 261s contacting the lower end of the water container 270.

The maximum width H2 of the water storage portion may be defined as a horizontal distance from a front end of the first water storage portion 262a to a rear end of the second water storage portion. In other words, the maximum height H1 of the first water storage portion 262a may be smaller than the maximum width H2 formed by the first water storage portion 262a and the second water storage portion 229.

In other words, the maximum width H2 formed by the first water storage portion 262a and the second water storage portion 229 may be defined as a length of the perpendicular line drawn from a point positioned at the frontmost (or the most front) of the first water storage portion to a point positioned in the rearmost of the second water storage portion.

The water stored in the water container 270 may flow into the first water storage portions 262a and 263 positioned below the water container seating surface 261s.

The water flowing into the first water storage portion 262a may flow to the second water storage portion 229. At this time, the first water storage portions 262a and 263 and the second water storage portion 229 may form the same water level.

In other words, the bottom surface of the first water storage portion 262a may be flush with the bottom surface of the second water storage portion 229. Therefore, the water provided from the water container 270 can maintain the same water level in the first water storage portion and the second water storage portion.

Accordingly, water supply noise generated in the water supply process from the water container 270 to the first and second water storage portions can be minimized.

Meanwhile, the water tub 260 may be formed such that the center of the front edge thereof is depressed downward. The recessed front edge of the water tray 260 may be referred to as a front incision portion 265.

The front incision portion 265 may be provided to allow a user to easily draw out the water container 270 from the water tub 260.

Figure 11:
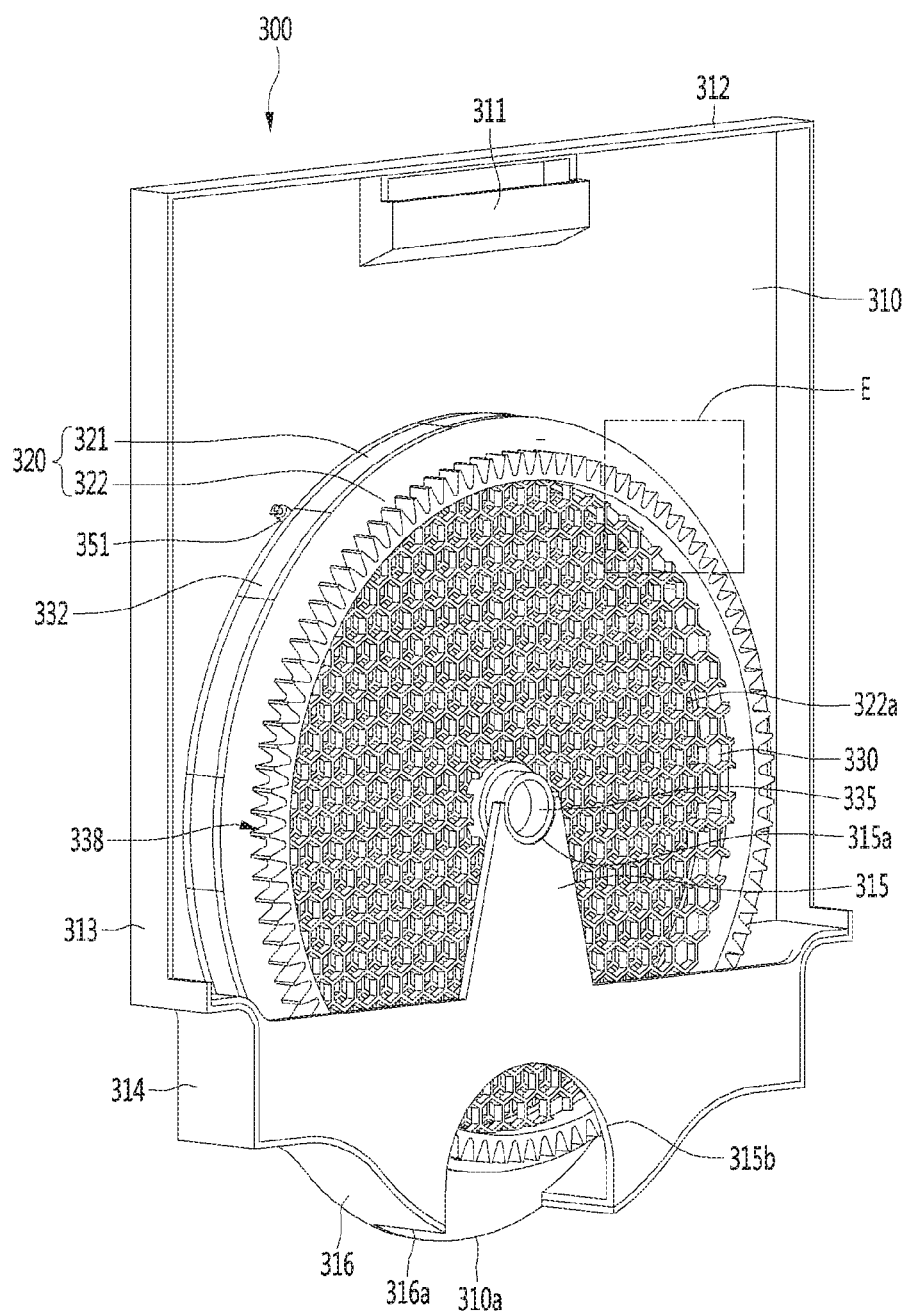
FIG. 11 is a rear perspective view of a humidifying filter assembly according to an embodiment of the present invention.
Figure 12:
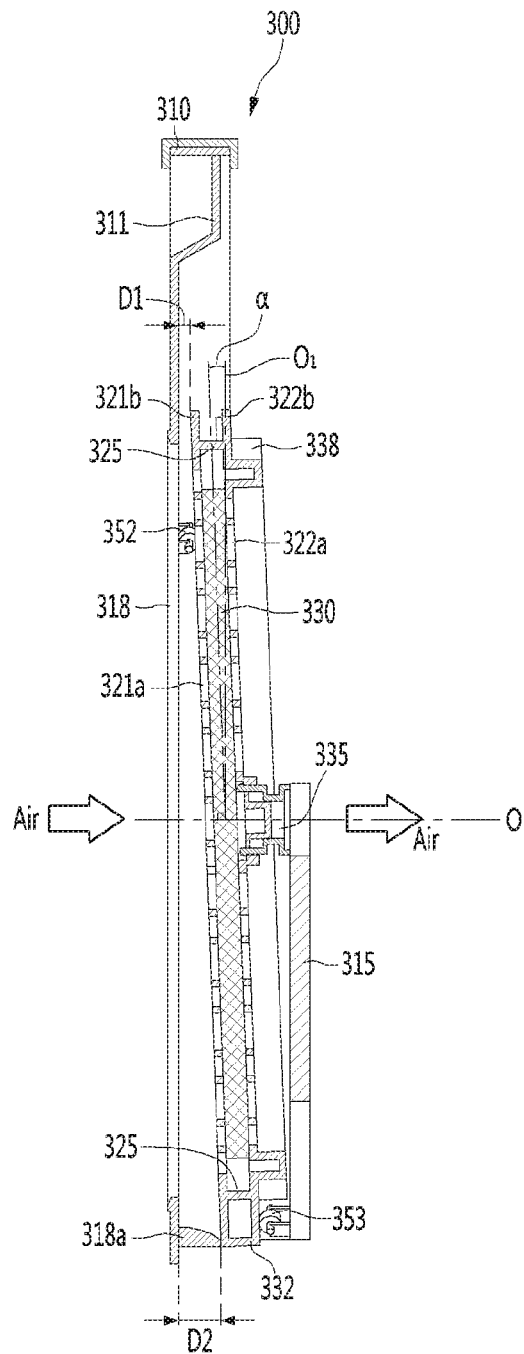
FIG. 12 is a longitudinal sectional view of a humidifying filter assembly according to an embodiment of the present invention.
Figure 13:
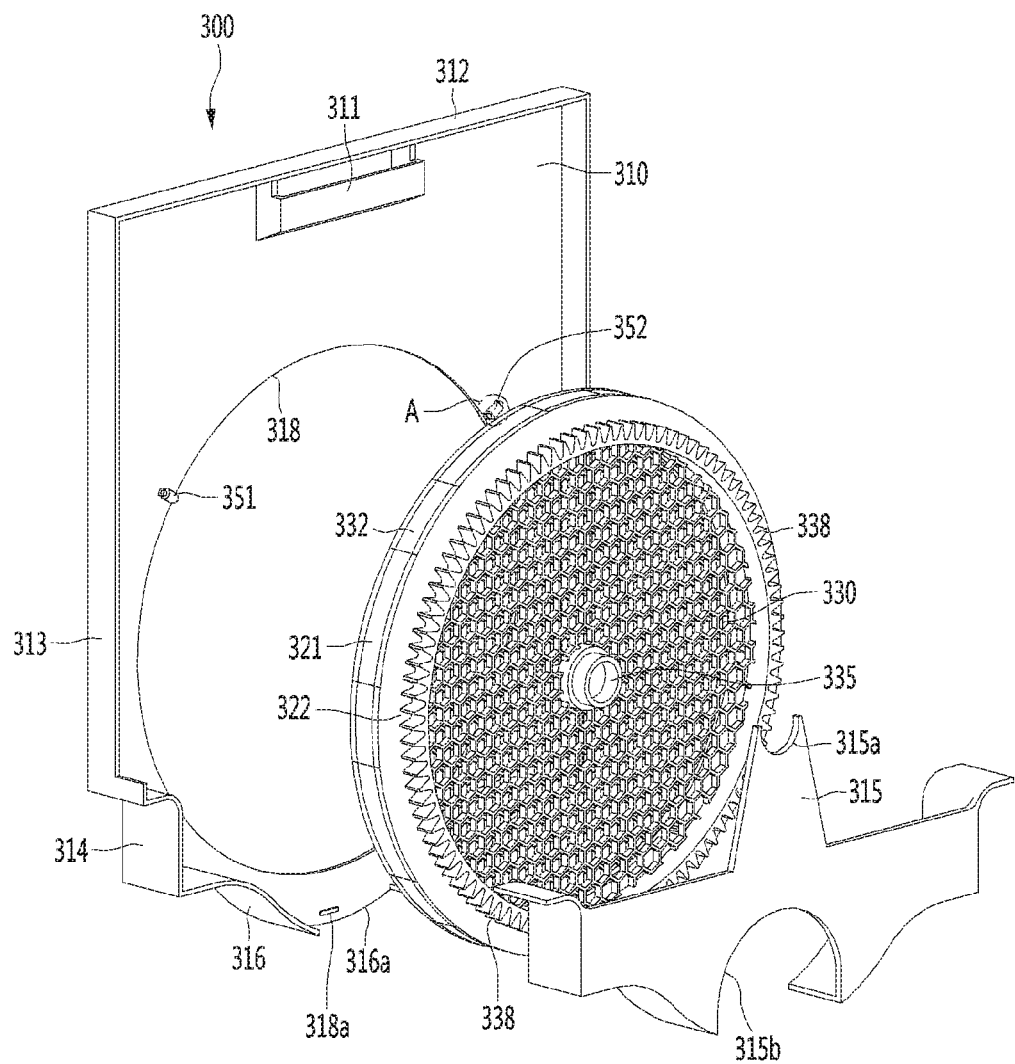
FIG. 13 is an exploded perspective view illustrating a configuration of a humidifying filter assembly according to an embodiment of the present invention.
Figure 14:
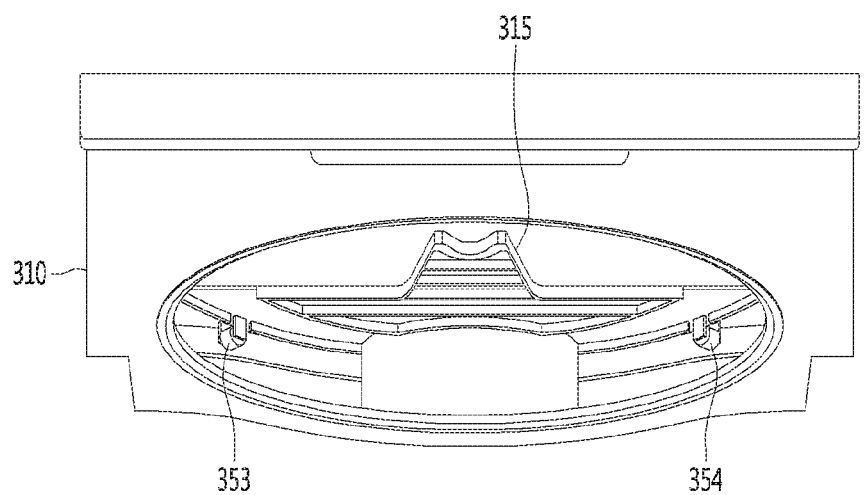
FIG. 14 is a perspective view illustrating a configuration of a humidifying filter case according to an embodiment of the present invention

FIG. 11 is a rear perspective view of a humidifying filter assembly according to an embodiment of the present invention, FIG. 12 is a longitudinal sectional view of a humidifying filter assembly according to an embodiment of the present invention, FIG. 13 is an exploded perspective view illustrating a configuration of a humidifying filter assembly according to an embodiment of the present invention, and FIG. 14 is a perspective view illustrating a configuration of a humidifying filter case according to an embodiment of the present invention.

Referring to FIG. 11 to FIG. 14, the humidifying filter assembly 300 includes a humidifying filter unit 320 on which the humidifying filter 330 is mounted, a humidifying filter case 310 which supports the humidifying filter unit 320 from the front, and a shaft support 315 which supports the humidification filter unit 320 from the rear.

As described above, the humidifying filter 330, the humidifying filter unit 320, and the collecting part 332 may be referred to as a "waterwheel". The humidification water can be rotated so as to contain water stored in the water tub 260.

The humidification filter unit 320 and the humidification filter 330 installed in the humidification filter unit 320 may be disposed between the humidification filter case 310 and the shaft support 315.

In other words, the shaft support 315 and the humidifying filter case 310 may form a space in which the humidifying filter unit 320 is disposed.

The humidifying filter case 310 and the shaft support 315 may be integrally formed. For example, the shaft support 315 may extend upward from the lower rear end of the humidifying filter case 310.

The front surface of the humidifying filter case 310 may be formed such that the lower end of the humidifying filter case 310 is convexly rounded downward. The lowest point 310a of the humidifying filter case 310 may be positioned at a midpoint bisecting the lower end portion of the humidifying filter case 310.

The lowest point 310a of the humidifying filter case 310 may be disposed to be submerged in the second water storage portion 229. The lowest point 310a may form a portion of the bottom surface opening 316a.

The humidifying filter case 310 includes an upper surface 312, a side surface 313, and a bottom surface 316 extending rearward along the periphery of the front surface. Accordingly, the humidifying filter case 310 can form an internal space in which the humidifying filter 330 can be positioned by the upper surface 312, the side surface 313, and the bottom surface 316.

The upper surface 312 of the humidifying filter case 310 may extend vertically from the upper end of the humidifying filter case 310 rearward.

The side surfaces 313 of the humidifying filter case 310 may extend downward from both ends of the upper surface 312, respectively. For example, the side surface 313 may extend vertically from the upper surface 312.

Here, the side surface 313 extending from one end portion of the upper surface 312 may be referred to as a first side surface and the side surface 313 extending from the other end portion of the upper surface 312 may be referred to as a second side surface.

The bottom surface 316 of the humidifying filter case 310 may extend arcuately downward from the lower end of the side surface 313.

In other words, the extending direction of the bottom surface 316 can be inclined downward. For example, the bottom surface 316 may be formed as a concave curved surface.

The bottom surface 316 may form a bottom surface opening 316a through which the water of the second water storage portion 229 flows.

The first bottom surface extending from the first side surface and the second bottom surface extending from the second side surface may extend in the directions opposite to each other, that is, the inside direction. The first bottom surface and the second bottom surface may be formed to be spaced apart from each other.

The bottom surface opening 316a can be understood as a space spaced apart from the first bottom surface and the second bottom surface.

The lowest point 310a may be positioned below the bottom surface opening 316a.

In addition, the lowest point 310a may be positioned above the bottom surface of the water tub case 261 defining the second water storage portion 229. Therefore, the water of the first water storage portion 263 may flow into the second water storage portion 229 through a space communicated below the lowest point 310a.

The humidifying filter assembly 300 may be inserted into both sides of the water tub 260 so as to engage with each other. In detail, the side surface 313 of the humidifying filter case 310 may include a stepped portion 314 which bends and extends inwardly.

The stepped portion 314 may be provided below the side surface 313. Therefore, the bottom surface 316 of the humidifying filter case 310 may extend from the stepped portion 314. The stepped portion 314 may be seated in the engaging portion 264 formed in the water tub 260.

The shaft support 315 may be formed to be separated from the humidifying filter case 310. For example, the shaft support 315 may form a side surface and a bottom surface so as to have a shape corresponding to the stepped portion 314 and the bottom surface 316.

In this case, the shaft support 315 may be inserted into the stepped portion 315 and the bottom surface 316 to be coupled with the humidifying filter case 310. The shaft support 315 may extend upward to connect the rear ends of both side surfaces and the rear end of the bottom surface of the shaft support 315.

The shaft support 315 may extend upward to support the humidification filter unit 320 from the rear.

In detail, the shaft support 315 may extend upward by a predetermined width toward a central shaft 335 of the humidifying filter unit 200. For example, the shaft support 315 may be formed in a trident shape when viewed from the front.

The shaft support 315 has a seating groove 315a on which the central shaft 335 is rotatably seated.

The seating groove 315a may be formed by recessing to be rounded the upper end portion of the shaft support 315 downwardly.

The shaft support 315 may have an incision port 315b formed at the lower end thereof. The incision port 315b may form a semicircular opening at the lower end of the shaft support 315.

The incision port 315b may form an opening perpendicular to an virtual plane drawn along the bottom surface opening 316a.

A humidifying filter unit 320 may be positioned in front of the shaft support 315. In other words, the shaft support 315 can support the humidifying filter unit 320 from the rear.

Accordingly, the shaft support 315 can support the humidifying filter unit 320 and the humidifying filter 330 from the rear.

Since the shaft support 315 for supporting the humidifying filter 330 from the rear does not block the air flowing into the intake opening 318 from the front, the intake area of the humidifying filter 330 can be relatively widened. In other words, the shaft support 315 can maximize the intake area of the air more than in a case of supporting the central shaft 335 of the humidification filter at the front.

In addition, the shaft support 315 has an advantage of reducing vibration of the humidifying filter unit 320 because the shaft support supports the humidifying filter unit 320 which is pushed rearward due to the flow of air in the opposite direction.

Meanwhile, the humidifying filter assembly 300 further includes a central shaft 335 for supporting the rotation of the humidifying filter unit 320. The central shaft 335 may be positioned at the center portion of the humidifying filter unit 320. Also, the central shaft 335 may be understood as a central shaft of the waterwheel.

As described above, the humidifying filter assembly 300 may further include a collecting part 332 for scooping up water of the water storage portions 262a and 229.

Since the collecting part 332 scoops up the water stored in the second water storage portion 229 through rotation of the waterwheel, the collecting part 332 can be referred to as a lifter.

The collecting part 332 can be rotated so as to be positioned below the edge formed by the stepped portion 314 and the bottom surface 316 of the humidifying filter case 310 in the second water storage portion 229. In addition, the collecting part 332 can rotate above the lowest point 310a of the humidifying filter case 310.

The humidifying filter unit 320 includes a first frame 321 and a second frame 322 for fixing the humidifying filter 330 in both directions.

The first frame 321 may fix the humidifying filter 330 at the front, and the second frame 322 may fix the humidifying filter 330 at the rear.

The second frame 322 may be provided with a filter gear 338 on the rear side thereof.

Meanwhile, the first frame 321 may be referred to as a filter support portion, and the second frame 322 may be referred to as a filter gear support portion.

The humidifying filter 330 may be positioned to be inserted between the first frame 321 and the second frame 322. For example, the humidifying filter 330 may be fixed to the bottom surface of the water tub 260 by being coupled to the first frame 321 and the second frame 322.

The first frame 321 includes a first outer frame 321b which extends radially from the outer periphery of the humidifying filter 330 so as not to interfere with the intake opening 318 of the humidifying filter case 310; and a first filter frame 321a for pressing the humidifying filter 330 from the front.

The first outer frame 321b may be formed so that the inner diameter thereof is equal to or larger than the diameter of the intake opening 318. Accordingly, the first outer frame 321b may be provided so as not to interfere with the flow of air flowing into the intake opening 318.

The first filter frame 321a may extend radially from the central shaft 335 to the first outer frame 321b. For example, the first filter frame 321a may be formed in a mesh shape having a plurality of holes. In addition, each of the plurality of holes may have a hexagonal shape.

The second frame 322 can be coupled to the rear side of the first frame 321.

In addition, the second frame 322 may include a second outer frame 322b and a second filter frame 322a in a configuration corresponding to the first frame 321.

The description of the structure of the second outer frame 322b and the second filter frame 322a makes the description of the first outer frame 321b and the first filter frame 321a available.

The first frame 321 and the second frame 322 may be collectively referred to as "frame". In addition, the first outer frame 321b and the second outer frame 322b may be collectively referred to as "outer frame". Likewise, the first filter frame 321a and the second filter frame 322a may be collectively referred to as "filter frame".

The second outer frame 322b may be positioned behind the first outer frame 321b. The second outer frame 322b and the first outer frame 321b may be symmetrical.

The second filter frame 322a may have a mesh shape in which a plurality of holes are formed. Accordingly, the second filter frame 322b can press the humidifying filter 330 from the rear.

A central shaft 335 may be coupled to the center of the second frame 322, that is, the center of the filter frame 321b.

The humidifying filter unit 320 further includes a collecting rib 325 extending vertically at one point of the outer frames 321b and 322b.

The collecting ribs 325 may extend vertically from the inner circumferential surfaces of the outer frames 321b and 322b.

In detail, the collecting rib 325 may extend vertically from the inner circumferential surface of any one of the first outer frame 321b and the second outer frame 322b and contact the inner circumferential surface of the other thereof. For example, the collecting rib 325 may extend vertically from the rear surface of the first outer frame 321b and contact the front surface of the second outer frame 322b.

The outer frame in which the collecting rib 325 is formed is not limited to the first outer frame 321b. For example, the collecting rib 325 may extend from the second outer frame 322b.

The collecting rib 325 may be formed to extend along the circumferential direction at a central portion of the outer frames 321b and 322b. In detail, the collecting rib 325 may extend along the circumferential direction of the outer frames 321b and 322b between the outer diameter and the inner diameter of the outer frames 321b and 322b.

In addition, the first frame 321, the second frame 322, and the collecting rib 325 can form a flowing groove 341 which is a space recessed along the periphery of the humidifying filter unit 320.

In detail, the flowing grooves 341 can form a recessed space defined by the rear surface of the first outer frame 321b, the collecting rib 325, and the front surface of the second outer frame 322b. Here, the collecting rib 325 may form a base surface defining the flowing grooves 341.

In other words, the flowing grooves 341 may form a space radially opened between the first outer frame 321b and the second outer frame 322b. Therefore, the flowing groove 341 can be understood as a space into which the water flows in order to scoop up the water stored in the second water storage portion 229.

The flowing grooves 341 can guide water stored in the second water storage portion 229 to be easily collected to the collecting part 332.

The collecting part 332 may be formed to shield a portion of the flowing groove 341. In other words, the collecting part 332 may be formed so that the radially opened surface and the shielded surface are alternately provided along the flowing grooves 341. Accordingly, the collecting part 332 may be provided along the outer periphery of the humidifying filter unit 320. The collecting part 332 will be described later in detail.

In addition, the collecting ribs 325 may guide the water contained from the second water storage portion 229 together with the collecting part 332 to flow down to the humidifying filter 330.

Specifically, any one collecting part 332 of the plurality of collecting parts 332 can contain the water in the second water storage portion 229 together with the flowing grooves 341. In addition, by the rotation of the humidifying filter unit 320, either one of the collecting parts 332 moves over the water surface of the second water storage portion 229.

The water contained in one of the collecting parts 332 can be moved along the base surface of the flowing groove 341 in a direction opposite to the rotating direction by the rotation of the humidifying filter unit 320.

Here, if the position of one of the collecting parts 332 is higher than the central shaft 335, the water may be discharged through the drop hole 326 formed in the collecting rib 325 under the influence of gravity. Ideally, water can fall through the drop hole 326 from a first point which is a position at which one of the collecting parts 332 is higher than the central shaft 335 to a second point which is a position which is rotated 180 degrees from the first point.

Accordingly, the water flowing downward through the drop hole 326 can wet the humidifying filter 330.

The central shaft 335 may be coupled to the central portion of the humidifying filter unit 320. The central shaft 335 can be rotated clockwise or counter-clockwise while being supported by the shaft support 315.

In detail, the central shaft 335 may be coupled to the center of the second frame 322. The central shaft 335 may be formed in a cylinder shape extending rearward from the center of the second frame 322.

The seating groove 315a may be formed so that the outer circumferential surface of the central shaft 335 is seated. Therefore, the central shaft 335 can be easily rotated from the seating groove 315a.

Meanwhile, the humidifying filter 330 and the humidifying filter unit 320 may be disposed to be inclined forward toward the upper end.

In other words, the humidifying filter 330 may be disposed diagonally from the bottom surface of the water tub 260. Accordingly, the intake area of the air introduced through the intake opening 318 can be maximized.

In a case where the humidifying filter 330 and the humidifying filter unit 320 are disposed diagonally, the collecting part 332 can be inserted into the water stored in the second water storage portion 229 to have an inclination.

Accordingly, since the collecting part 332 is inserted obliquely into the water of the second water storage portion 229 by the rotation of the humidifying filter unit 320, a vertical component force which can generate a relatively large friction noise with water can be reduced. Therefore, the friction noise between the collecting part 332 and the water of the second water storage portion 229 can be minimized.

In detail, the shortest distance D1 from the uppermost end of the humidifying filter unit 320 to the humidifying filter case 310 may be shorter than the shortest distance D2 from the lowermost end of the humidifying filter unit 320 to the humidifying filter case 310.

In other words, the waterwheel may be inclined such that a vertical distance from the humidifying filter case 310 to the upper end of the waterwheel is shorter than a vertical distance from the humidifying filter case 310 to the lower end of the waterwheel.

In other words, the waterwheel can be rotated and disposed such that the upper end thereof is inclined forward in the cabinet 100 relative to the lower end.

The central shaft 335 may be coupled to the center of the second outer frame 322b. The center of the second outer frame 322b may be coupled to be inclined with respect to the outer surface of the central shaft 335.

In other words, the central shaft 335 may form a groove for guiding the center of the second outer frame 322b to be obliquely combined. The groove of the central shaft 335 may be formed to be obliquely recessed along the outer surface. Accordingly, the first outer frame 321b and the humidifying filter 330, which are coupled with the second outer frame 322b, may be obliquely disposed.

A virtual vertical line perpendicular to the axis line O of the central shaft 335 can be defined as a shaft perpendicular line O1.

The second outer frame 322b may be coupled to the central shaft 335 such that the humidifying filter 330 is inclined forward by a predetermined angle α from the shaft perpendicular line O1.

The predetermined angle α may be set to an angle between 0 and 5 degrees.

The filter gear 338 provided on the rear surface of the second outer frame 322b can be obliquely engaged with the driving gear 355 in a case where the predetermined angle α exceeds 5 degrees. Accordingly, wear of the gear teeth can be relatively fast, and noise due to rotation between the filter gear 338 and the driving gear 355 can be generated.

Of course, the driving gear 355 may be provided at an inclination corresponding to the inclination of the filter gear 338.

The central shaft 335 may include a bearing (not illustrated) to facilitate the rotation of the second outer frame 322b, which is obliquely coupled.

The bearing may be installed at a coupling portion between the central shaft 335 and the second outer frame 322b. Accordingly, the second outer frame 322b can be stably rotated even when the second outer frame is coupled to be inclined from the central shaft 335 disposed along the axis line O.

In addition, the humidification filter unit 320 can be stably supported even when a diagonal line is disposed by a plurality of guide rollers 352 and 353 to be described later.

As described above, the humidifying filter assembly 300 includes a filter gear 338 interlocked with the driving gear 355.

The filter gear 338 receives power from the driving gear 355 and rotates the humidification filter unit 320.

In detail, the filter gear 338 may be installed along the second outer frame 322b. For example, the filter gear 338 may engage the rear surface of the second outer frame 322b. Accordingly, the filter gear 338 may be disposed so as not to interfere with the flow of air passing through the humidifying filter 330.

When the filter gear 338 rotates, the humidifying filter unit 320 and the humidifying filter 330 coupled to the filter gear 338 can rotate together.

The humidifying filter assembly 300 further includes guide rollers 351, 352, 353 and 354 for supporting the humidifying filter unit 320.

The guide rollers 351, 352, 353, and 354 may be positioned on an inner surface of the humidifying filter assembly 300.

Here, the inner surface of the humidifying filter assembly 300 may include a rear surface of the humidifying filter case 310 and a front surface of the shaft support 315.

In other words, the guide rollers 351, 352, 353, and 354 can be installed on the inner surfaces of the humidifying filter case 310 and the shaft support 315.

The guide rollers 351, 352, 353 and 354 may include front guide rollers 351 and 352 for guiding the rotation of the waterwheel in front of the waterwheel, and rear guide rollers 353 and 354 for guiding rotation of the waterwheel.

The front guide rollers 351 and 352 are in contact with the front surface of the humidifying filter unit 320 and can perform rolling motion along the rotation of the humidifying filter unit 320. For example, the front guide rollers 351 and 352 may contact the upper surface of the front surface of the first outer frame 321b.

The front guide rollers 351 and 352 may be provided to protrude rearward from the rear surface of the humidifying filter case 310.

The rear guide rollers 353 and 354 contact the rear surface of the humidifying filter unit 320 and can perform rolling motion along the rotation of the humidifying filter unit 320. For example, the rear guide rollers 353 and 354 may be in contact with the lower rear surface of the second outer frame 322b.

The rear guide rollers 353 and 354 may be provided to protrude forward from the front surface of the shaft support 315.

The front guide rollers 351 and 352 and the rear guide rollers 353 and 354 can support the front and rear surfaces of the humidifying filter unit 320. In detail, the front guide roller 351 supports the front upper portion of the waterwheel, and the rear guide rollers 353 and 354 supports the rear lower portion of the waterwheel.

Accordingly, the guide rollers 351, 352, 353, and 354 together with the support protrusions 318a can stably support the rotation of the humidification filter unit 320 arranged diagonally.

The front guide rollers 351 and 352 may be spaced along the circumferential direction of the intake opening 318 on the rear surface of the humidifying filter case 310. For example, the guide rollers 351 and 352 may be positioned in a virtual circle drawn along a predetermined diameter from the center of the intake opening 318.

The predetermined diameter is set to be larger than the diameter of the intake opening 318 and smaller than the outer frames 321b and 322b of the humidifying filter unit 320. Here, the outer frame may be understood as the outer diameter of the first outer frame 321b.

The front guide rollers 351 and 352 can stably maintain the balance of the humidifying filter 330 together with the rear guide rollers 353 and 354 which support the humidifying filter unit 320 from the rear by supporting the humidification filter unit 320 from the front.

In addition, the guide rollers 351, 352, 353, and 354 can stably maintain the balance of the humidifying filter unit 320 disposed diagonally together with the central shaft 335 which is seated on the shaft support 315.

In particular, since the humidifying filter 330 is rotated together with the humidifying filter unit 320, the humidifying filter 330 maintains the balance thereof by the front guide rollers 351 and 352, the rear guide rollers 353 and 354, and the shaft support 315 and can be stably rotated.

The guide rollers 351, 352, 353 and 354 can prevent the humidification filter unit 320 from contacting the rear surface of the humidifying filter case 310 and the front surface of the shaft support 315. Therefore, the rotational friction and vibration of the humidifying filter unit 320 can be reduced. Accordingly, noise caused by the waterwheel can be minimized.

In addition, the guide rollers 351, 352, 353, and 354 are capable of rolling depending on the rotation of the humidifying filter unit 320. For example, the guide rollers 351, 352, 353, and 354 may include a cylindrical-shaped roller or a ball-shaped roller.

A plurality of guide rollers 351, 352, 353, and 354 may be provided.

The front guide rollers 351 and 352 may include a first guide roller 351 and a second guide roller 352.

The first guide roller 351 and the second guide roller 352 may be disposed along the upper semicircle of the intake opening 318. In detail, the first guide roller 351 and the second guide roller 352 may be coupled so as to be spaced apart from the rear surface of the humidifying filter case 310.

In addition, the first guide roller 351 may be coupled to the rear surface of the humidifying filter case 310 so as to form an acute angle with respect to the second guide roller 352 and the central shaft 335.

Accordingly, the first guide roller 351 and the second guide roller 352 can stably support the humidifying filter unit 320 whose upper end can be inclined forward.

The rear guide rollers 353 and 354 may include a third guide roller 353 and a fourth guide roller 354.

The third guide roller 353 and the fourth guide roller 354 may be spaced apart from each other along the circumferential direction of the second outer frame 322b on the front surface of the shaft support 315.

In detail, the third guide roller 353 and the fourth guide roller 354 may be coupled to the front surface of the shaft support 315 so as to correspond to the rear surface of the second outer frame 322b.

The third guide roller 353 may be coupled to the front surface of the shaft support 315 so as to form an acute angle with respect to the fourth guide roller 354 and the central shaft 335.

Accordingly, the third guide roller 353 and the fourth guide roller 354 can stably support the humidifying filter unit 320 whose lower end can be inclined rearward.

Figure 15:
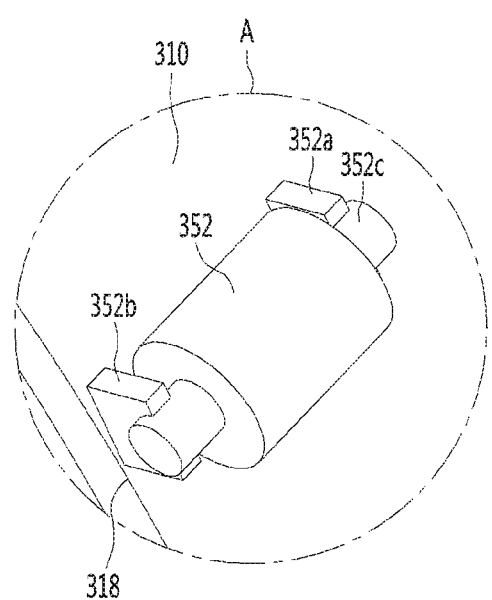
FIG. 15 is an enlarged view of 'A' in FIG. 13.

FIG. 15 is an enlarged view of 'A' in FIG. 13. In detail, FIG. 15 is an enlarged view of the second guide roller 352.

The plurality of guide rollers 351, 352, 353, and 354 have the same configuration as that of the second guide roller 352 except for the installation position thereof. Therefore, the description of the configuration of the plurality of guide rollers 351, 352, 353, and 354 allows the following configuration of the second guide roller 352 to be used.

Referring to FIG. 15, the second guide roller 352 is provided with a roller 352 for performing rolling motion, a first roller rib 352a and a second roller rib 352b, which are members for fixing the roller.

The first roller ribs 352a and the second roller ribs 352b may protrude rearward from the rear surface of the humidifying filter case 310.

The first roller ribs 352a and the second roller ribs 352b may be spaced apart from the center of the intake opening 318 in the radial direction.

The second guide roller 352 may further include a roller shaft 352c, which is a shaft for rotating the roller 352.

The roller shaft 352c may be formed to pass through the center of the roller 352. Accordingly, the roller 352 can perform rolling motion around the roller shaft 352c.

One end portion of the roller shaft 352c is coupled to the first roller rib 352a, and the other end portion of the roller shaft 352c is coupled to the second roller rib 352b. Accordingly, the second guide roller 352 can be stably fixed to the humidifying filter case 310.

The guide rollers 351, 352, 353, and 354 can perform rolling motion corresponding to the rotation of the outer frame of the humidifying filter unit 320. Therefore, the humidifying filter unit 320 can be guided to rotate stably. As a result, the friction noise due to the rotation of the waterwheel can be reduced.

Figure 16:
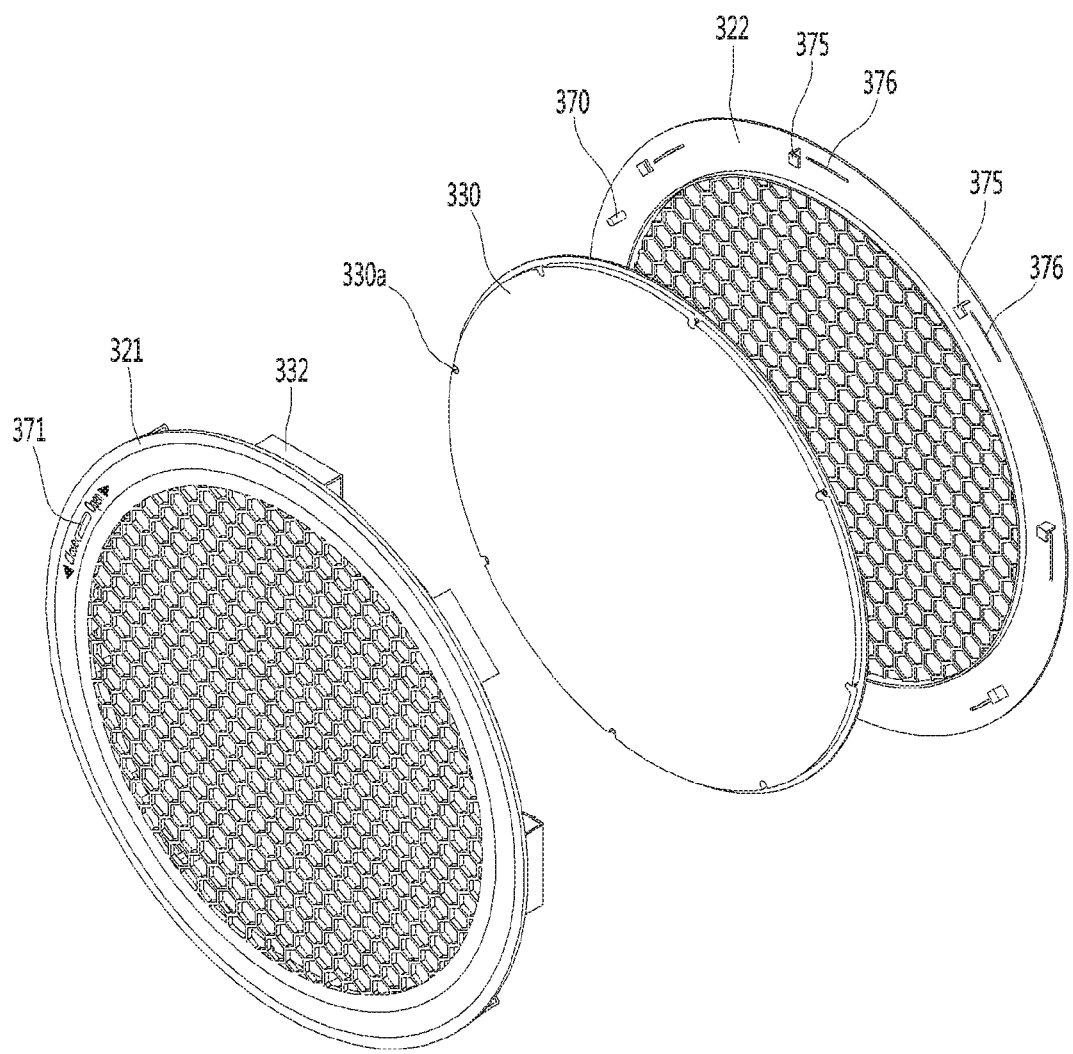
FIG. 16 is an exploded perspective view of a humidifying filter unit according to an embodiment of the present invention.
Figure 17:
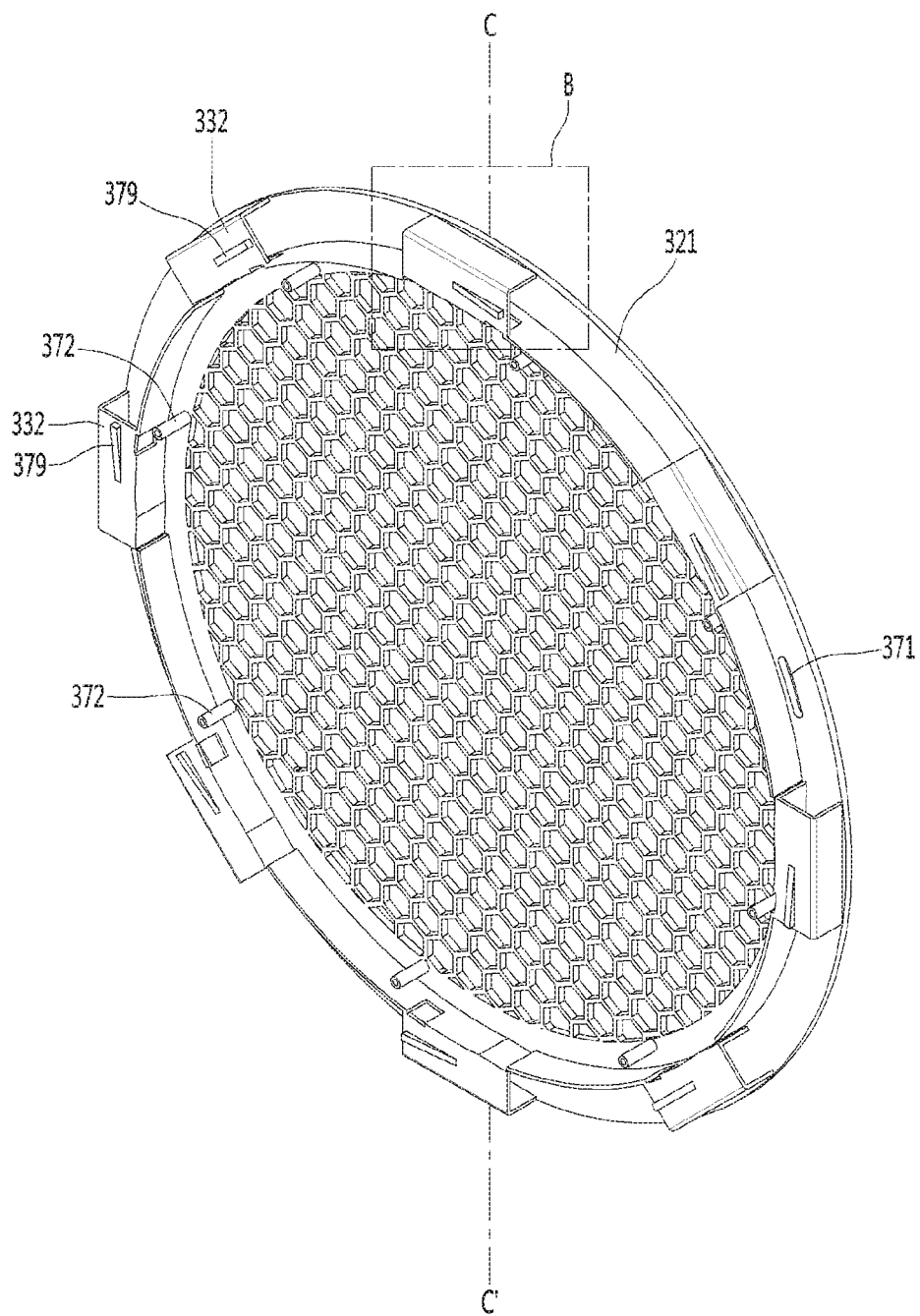
FIG. 17 is a rear perspective view illustrating a filter support portion (first frame) according to an embodiment of the present invention.

FIG. 16 is an exploded perspective view of a humidifying filter unit according to an embodiment of the present invention, and FIG. 17 is a rear perspective view illustrating a filter support portion (first frame) according to an embodiment of the present invention.

Referring to FIG. 16 and FIG. 17, the second frame 322 may further include an operating rod 370 inserted into the first frame 321.

The operating rod 370 may extend vertically from one surface of the second outer frame. For example, the operating rod 370 may be formed in a cylindrical shape.

The first frame 321 may form an operation hole 371 into which the operating rod 370 is inserted.

The operation hole 371 may be formed as an opening through which the operating rod 370 passes through the first outer frame of the first frame 321.

In a case where the first frame 321 and the second frame 322 are coupled, the user can rotate the operating rod 370 in one direction. Accordingly, the first frame 321 and the second frame 322 can be easily separated.

In detail, the second frame 322 may further include a pressing protrusion 375 protruding from one surface of the second outer frame to be coupled with the first frame 321, and a contact line 376 which extends by a predetermined length in the circumferential direction.

A plurality of pressing protrusions 375 and a plurality of contact lines 376 may be provided. A plurality of disassembly guides 379 may be provided to correspond to the pressing protrusions 375, which will be described later.

The pressing protrusion 375 may be positioned at the extending end of the contact line 376. The pressing protrusion 375 may have a large protruding length in the extending direction of the contact line 376. In other words, the pressing protrusion 375 can form an inclination.

The first frame 321 may further include a disassembly guide 379 protruding from the collecting part 322.

The disassembly guide 379 may be formed to protrude from one surface of the collecting part 322 that is in contact with the second frame 322. The disassembly guide 379 may be formed at a position corresponding to the pressing protrusion 375 and the contact line 376.

In addition, the disassembly guide 379 may extend in the circumferential direction. For example, the disassembly guide 379 may extend to correspond to the contact line 376. The disassembly guide 379 may extend so as to be inclined in the extending direction.

The disassembly guide 379 may be positioned to be in close contact with the upper side or the lower side of the contact line 376 in a case where the first frame 321 and the second frame 322 are coupled to each other.

In a case where the user rotates the operating rod 370, the disassembly guide 379 may be rotated along the guide of the contact line 376 to contact the pressing protrusion 375.

The disassembly guide 379 contacting the pressing protrusion 375 may be gradually separated as the pressing protrusion 375 is rotated by the inclination of the pressing protrusion 375. In this case, the humidification filter unit 320 can be easily coupled or separated. Therefore, the replacement of the humidifying filter 330 can be facilitated.

Meanwhile, the humidifying filter 330 may form a filter hole 330a into which the fastening member is inserted to be fixed to the first frame 321 or the second frame 322. For example, the plurality of filter holes 330a may be provided along the outer circumference of the humidifying filter 330.

The humidifying filter 330 may be fixed between the first frame 321 and the second frame 322 by fastening members inserted into the filter holes 330a.

Figure 18:
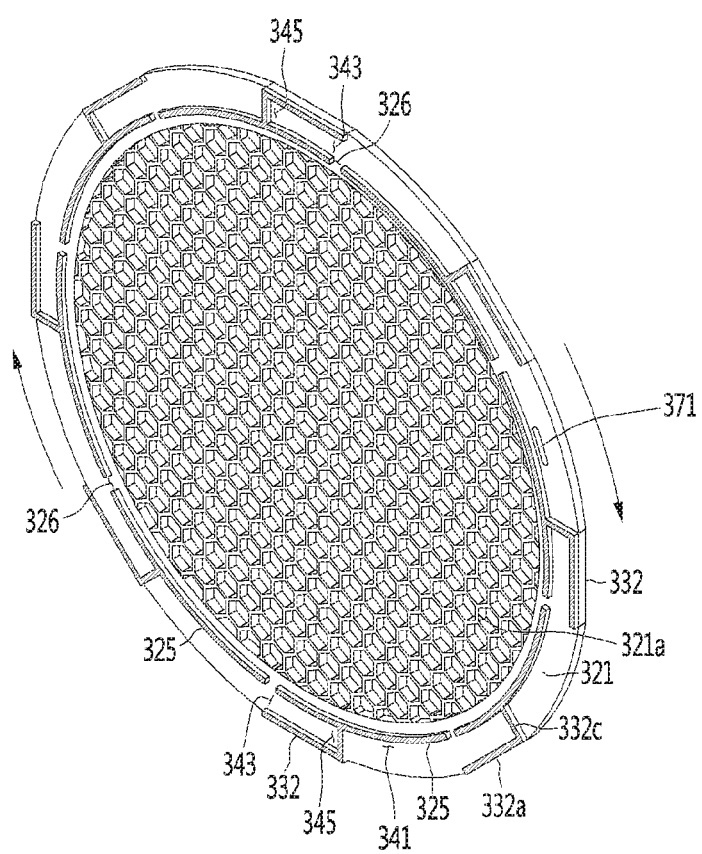
FIG. 18 is a sectional view taken along the line C-C' in FIG. 17.
Figure 19:
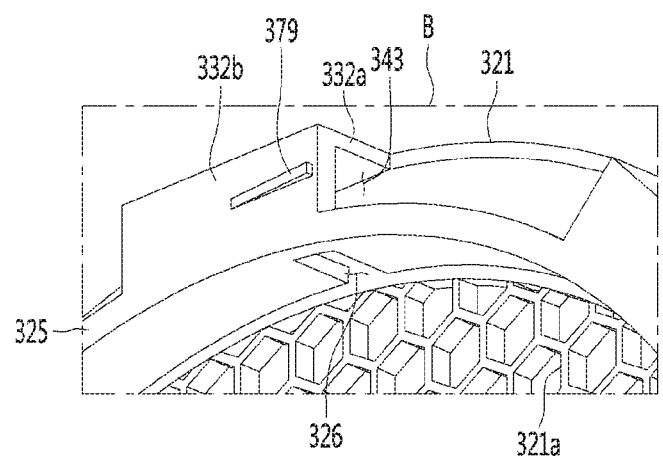
FIG. 19 is an enlarged view of 'B' in FIG. 17.

FIG. 18 is a cross-sectional view taken along line C-C' of FIG. 17, and FIG. 19 is an enlarged view of portion "B" of FIG. 17.

Referring to FIG. 18 and FIG. 19, a plurality of collecting parts 332 may be provided.

The collecting part 332 is configured to allow water to flow into the flowing grooves 341 by rotation of the humidifying filter unit 320.

In other words, the collecting part 332 may be formed to shield a portion of the flowing groove 341 formed in the circumferential direction of the humidifying filter unit 320. For example, the collecting part 332 may extend from the collecting rib 325 in the shape of '¬'.

More specifically, the collecting part 332 is provided with a shielding wall 332c extending radially from the collecting rib 325 with respect to the central shaft 335, and an upper wall 332a extending in the rotational direction or the circumferential direction of the humidifying filter unit 320.

The shielding wall 332c and the upper wall 332a may be collectively referred to as the "wall" of the collecting part 332.

In other words, the wall may extend from the edge of the first outer frame 321b to connect an edge of the second outer frame 322b.

The shielding wall 332c may extend vertically from a tangent line through one point of the collection rib 325. In addition, the upper wall 332a may extend from the shielding wall 332c in the extending direction of the collecting rib 325.

Accordingly, the collecting part 332 can form a space which is radially spaced apart from the collecting rib 325 and into which water flows. Here, the space through which the water flows into may be referred to as a collecting groove 345.

In other words, the shielding wall 332c and the upper wall 332a can form the collecting groove 345 in which water flowing from the second water storage portion 229 is collected. For example, the shielding wall 332c and the upper wall 332a may extend from the collecting rib 325 to form the collecting groove 345.

The extending direction of the upper wall 332a may coincide with the rotating direction of the waterwheel. Therefore, the water stored in the second water storage portion 229 can flow into the collection groove 345 by the rotation of the waterwheel.

An extending end portion defined as an end portion in the extending direction of the upper wall 332a may form an inflow hole 343, which is an opening for introducing water flowing into the collecting groove 345. The inflow hole 343 and the collecting groove 345 communicates with each other.

A drop hole 326 is formed in the collecting rib 325, which is an opening through which the water scooped up into the collecting groove 345 can fall, by the number corresponding to the collecting part 332.

A virtual straight line drawn from the extending end portion of the upper wall 332a toward the central shaft 335 can form a perpendicular line at one tangent line of the collecting rib 325. And the foot of the perpendicular line may be positioned in front of the drop hole 326 in the rotating direction of the waterwheel.

The water flowing into the collecting part 332 falls into the humidifying filter 330 through the drop hole 326 when the collecting part 332 and the collecting rib 325 are turned upside down by rotation.

Meanwhile, the size of the collecting groove 345 can be variously formed. For example, in order to increase the capacity of the water to be scooped up, the upper wall 322a or the shielding wall 332c may extend further in the circumferential or radial direction. For example, the shielding wall 332c may extend further radially than the outer frame.

The collecting part 332 may further include a side wall 332*b* connecting the shielding wall 332*c* and the upper wall 332*a*.

The side wall 332*b* may extend in a direction opposite to the first outer frame and/or the second outer frame.

The water scooped up from the collecting part 332 by the rotation of the filter gear 338 can be filled into the collecting groove 345 along the inner surface of the upper wall 332*a*.

In addition, in the process of rotating the humidifying filter unit 320, the water in the collecting groove 345 can flow into the drop hole 326 while moving in the inner surface of the shielding wall 332*c* and the collecting rib 325.

The water discharged through the drop hole 326 may wet the humidifying filter 330. In other words, water flowing down through the drop hole 326 is soaked into the humidifying filter 330, and the air introduced from the intake opening 318 is humidified while passing through the humidifying filter 330.

Hereinafter, embodiments of the filter gear 338 and the driving gear 355 coupled in the directions in which the door assembly 200 is drawn into and out, that is, the front and rear direction will be described in detail.

The driving gear 355 and the filter gear 335 according to the embodiment of the present invention can be engaged in the front and rear direction.

In addition, the driving gear 355 and the filter gear 335 according to the embodiment of the present invention can more easily and smoothly couple between the two gears engaged in the front and rear direction.

In addition, the driving gear 355 and the filter gear 335 according to the embodiment of the present invention can achieve the coupling between the two gears by providing a relatively small force by the user.

The driving gear 355 and the filter gear 335 according to the embodiment of the present invention can minimize the noise by reducing the frictional resistance due to the contact between the two gears. In other words, it is possible to improve the quietness of the waterwheel.

Figure 20:
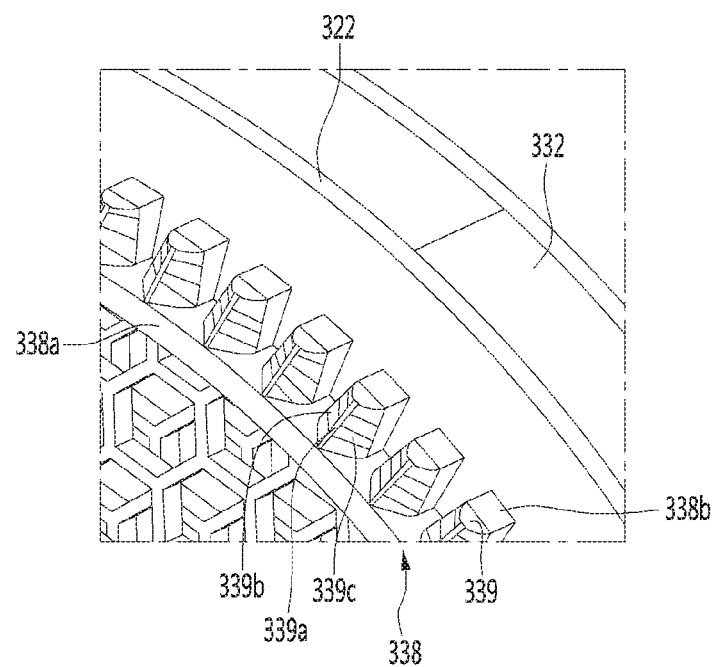
FIG. 20 is an enlarged view of 'E' in FIG. 11.

FIG. 20 is an enlarged view of 'E' in FIG. 11.

Referring to FIG. 20, the filter gear 338 includes a filter gear frame 338*a* and a filter gear teeth 338*b*.

The filter gear frame 338*a* may extend vertically rearward from the second outer frame 322*b*. The filter gear frame 338*a* may extend around the second outer frame 322*b*.

In other words, the filter gear frame 338*a* may be provided on the rear surface of the second frame 322. The filter gear frame 338*a* may extend in the circumferential direction of the second frame 322. Here, the circumferential direction can be understood as a direction formed by a trace of a point at the same distance with respect to the central shaft 335.

The filter gear frame 338*a* may be formed in a ring shape.

The filter gear teeth 338*b* may be defined as a gear-tooth of the filter gear 338. In other words, the filter gear teeth 338*b* can form teeth from the filter gear frame 338*a*.

The filter gear teeth 338*b* may protrude radially from the filter gear frame 338*a*. Here, the radial direction can be understood as a direction extending from the central shaft 335 to the outer frame.

A plurality of filter gear teeth 338*b* may be disposed at predetermined intervals along the circumference of the filter gear frame 338*a*.

The filter gear 338 further includes a slip guide 339 for guiding the coupling with the driving gear 355.

The slip guide 339 can slide a coupling boss 358, which will be described later, to one side or the other side.

The slip guide 339 may be formed on the filter gear teeth 338*b*. In detail, the slip guide 339 may be formed to protrude rearward from the filter gear teeth 338*b*.

The protruding direction of the slip guide 339 can be understood as a direction in which the filter gear teeth 338*b* is perpendicular to the radial direction protruding from the filter gear frame 338*a* and rearward.

The slip guide 339 can extends from the filter gear teeth 338*b* so that the widths of both ends of the slip guide 339 become narrower toward the rear.

In other words, both side surfaces of the slip guide 339 may be formed as an inclined surface. For example, the cross-section of the slip guide 339 may form a triangular shape.

An inclined surface formed on one side surface of the slip guide 339 is defined as a first inclined portion 339*b* and an inclined surface formed on the other side surface of the slip guide 339 is defined as a second inclined portion 339*c*.

The first inclined portion 339*b* and the second inclined portion 339*b* may extend from both ends of the filter gear teeth 338*b* rearward to contact with each other. For example, a virtual straight line drawn in the extending direction of the first inclined portion 339*b* may be in contact with or intersect with a virtual straight line drawn in the extending direction of the second inclined portion 339*c*.

The rear end portion 339*a* of the slip guide 339 may be defined as an edge where the first inclined portion 339*b* and the second inclined portion 339*c* contact each other.

The rear end portion 339*a* of the slip guide 339 may be formed as a curved surface. Accordingly, the rear end portion 339*a* of the slip guide 339 is in contact with the curved surface portion 359 of the coupling boss 358 to be described later so as to be capable of guiding the coupling boss 358 to one side or the other side.

Figure 21:
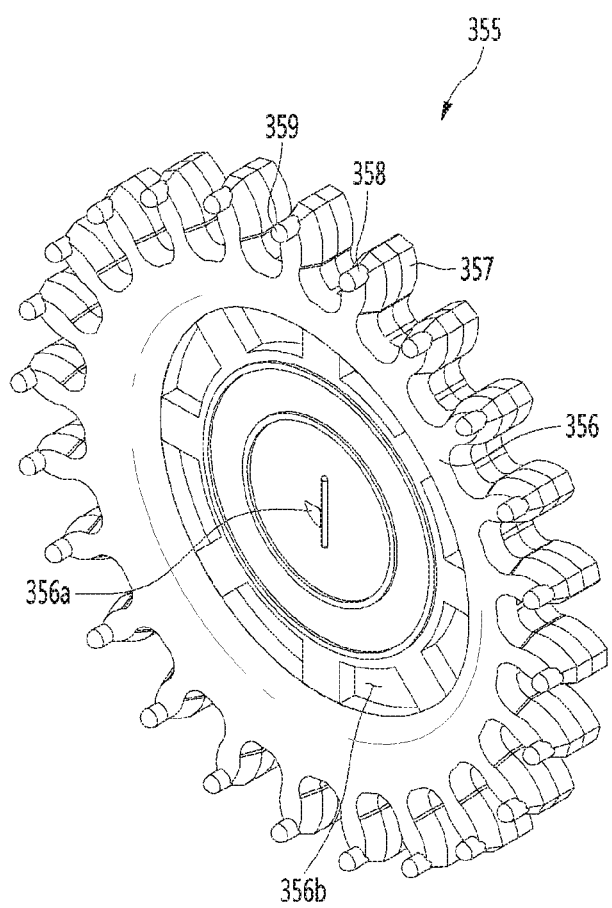
FIG. 21 is a perspective view illustrating a configuration of a humidification filter driving gear according to an embodiment of the present invention.

FIG. 21 is a perspective view illustrating a configuration of a humidifying filter driving gear according to an embodiment of the present invention.

Referring to FIG. 21, the driving gear 355 includes a driving gear frame 356 and a driving gear teeth 357.

In detail, the driving gear frame 356 may extend in the radial direction from the motor shaft coupling hole 356*a* to which the shaft 353*a* of the waterwheel motor 353 is coupled. For example, the driving gear frame 356 may include a disk shape.

The driving gear frame 356 may be formed with a plurality of perforation holes 356*b* for reducing weight.

A motor shaft coupling hole 356*a* connected to the waterwheel motor 353 may be formed at the center of the driving gear frame 356. The shaft of the waterwheel motor 353 is coupled to the motor shaft coupling hole 356*a* so that the power of the waterwheel motor 353 can be transmitted to the driving gear 355.

The outer periphery of the driving gear frame 356 may be thicker than the central portion. The outer periphery of the driving gear frame 356 may extend in the circumferential direction. Here, the circumferential direction can be understood as a direction formed by a trace of a point at the same distance with reference to the motor shaft coupling hole 356*a*.

The driving gear teeth 357 may be defined as a gear-tooth of the driving gear 355. In other words, the driving gear teeth 357 can form teeth from the driving gear frame 356.

The driving gear teeth 357 may be formed to protrude from the driving gear frame 356.

In detail, the driving gear teeth 357 may extend in the radial direction from the outer periphery of the driving gear frame 356. Here, the radial direction can be understood as a direction extending toward the driving gear frame 356 around the motor shaft coupling hole 356a.

A plurality of driving gear teeth 357 may be disposed at a predetermined interval along the periphery (circumferential direction) of the driving gear frame 356.

The driving gear 355 further includes the coupling boss 358 for guiding coupling with the filter gear 338.

When the door assembly 200 is pushed into the cabinet 100, the coupling boss 358 contacts the slip guide 339 and can slide in one side or another side.

The coupling boss 358 may be formed on the driving gear teeth 357. For example, the coupling boss 358 may be formed at the front end of the driving gear teeth 357.

More specifically, the coupling boss 358 may protrude forward from the driving gear teeth 357 to be in contact with the slip guide 339. For example, the protruding direction of the coupling boss 358 may be perpendicular to the protruding direction of the driving gear teeth 357.

The driving gear teeth 357 in which the coupling boss 358 is formed can form an inclined surface so that the width of both ends of the driving gear teeth 357 becomes narrower toward the coupling boss 358. The inclined surface of the driving gear teeth 357 can be formed to easily slide into the first inclined portion or the second inclined portion of the slip guide 339 described above.

In other words, the coupling boss 358 and the slip guide 339 may extend so as to protrude in directions opposite to each other.

The coupling boss 358 may have a cylindrical shape. The coupling boss 358 may be formed in a hemispherical shape so that the front end portion thereof slides easily when the slip guide 339 is brought into contact with the front end portion.

In other words, the coupling boss 358 may include a curved surface portion 359. In detail, the curved surface portion 359 is formed at the front end of the coupling boss 358, and may be formed in a blunt hemispherical shape.

Accordingly, when the slope guide 339 and the coupling boss 358 are in contact with each other while the filter gear 339 is drawn thereinto, the curved surface portion 359 can easily slide in the first inclined portion 339b or the second inclined portion 339c. The driving gear teeth 357 and the filter gear teeth 338b rotate to a minimum by the coupling boss 358 that slides along the first inclined portion 339b or the second inclined portion 339c, and thus the filter gear teeth 338b can be inserted between the two driving gear teeth 357. As a result, the filter gear teeth 338 and the driving gear teeth 357 can be coupled to be engaged with each other.

Figure 22:
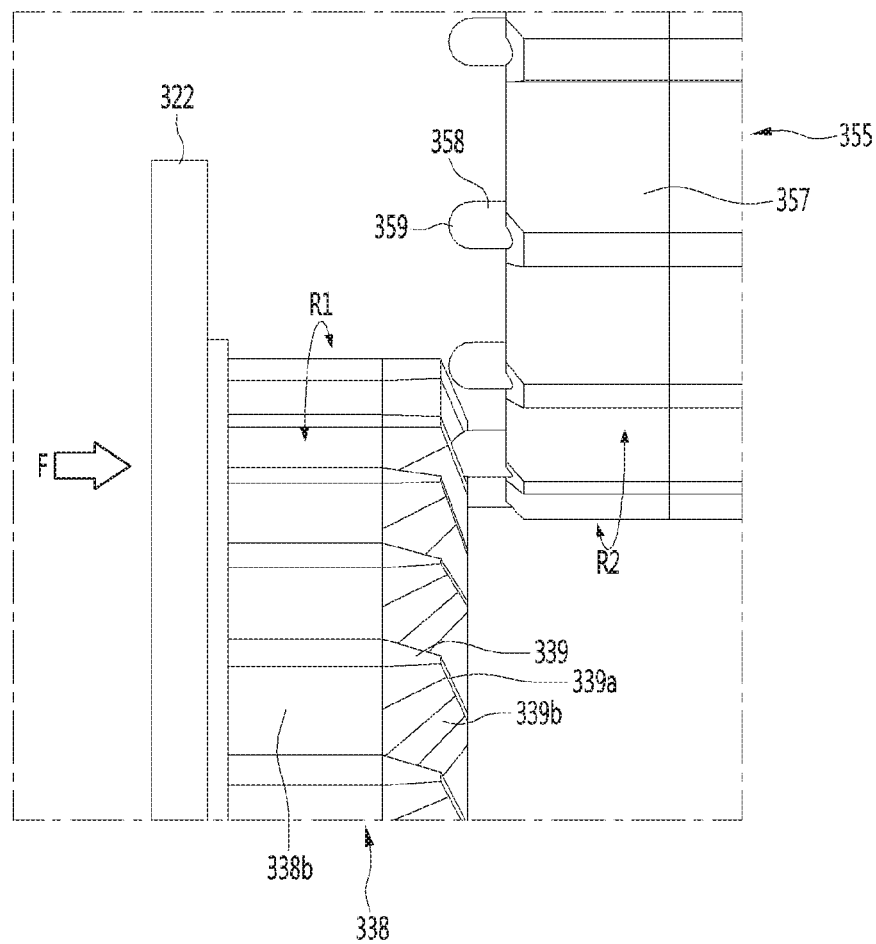
FIG. 22 is a view illustrating a process of engaging a humidifying filter driving gear and a filter gear according to an embodiment of the present invention.

FIG. 22 is a view illustrating a process of engaging a humidifying filter driving gear and a filter gear according to an embodiment of the present invention.

Referring to FIG. 22, the process of coupling the filter gear 338 and the driving gear 355 according to the embodiment of the present invention so as to be engaged with each other will be described in detail.

The door assembly 200 may be drawn into or inserted into the cabinet 100 by an external force of a user. At this time, the direction F in which the filter gear 338 is drawn into may be the same as the direction of the force due to the external force of the user.

Along with the operation in which the door assembly 200 is drawn into the cabinet 100, the filter gear 338 moving rearward may be in contact with the driving gear 355 fixed in the cabinet 100. For example, the rear end 339a of the slip guide 339 which is moved into the cabinet 100 along the direction F may be brought into contact with the coupling boss 358.

In a case where the rear end portion 339a of the slip guide 339 and the curved surface portion 359 of the coupling boss 358 are in contact with each other, since both the rear end portion 339a of the slip guide 339 and the curved surface portion 359 of the coupling boss 358 are formed as the curved surfaces, the curved surface portion 359 of the coupling boss 358 can be easily slid to the first guide portion 339b or the second guide portion 339c. Therefore, the slip guide 339 can guide the coupling boss 358 to slip toward one side or the other side while proceeding in the direction F.

When the coupling boss 358 slides along the first inclined portion 339b or the second inclined portion 339c of the slip guide 339, the driving gear teeth 357 and/or the filter gear teeth 338b can rotate. Here, the rotation direction R1 of the filter gear teeth 338b may be opposite to the rotation direction R2 of the driving gear teeth 357.

In other words, the driving gear teeth 357 and the filter gear teeth 338b are rotated so that the filter gear 338 is moved in the direction F and the filter gear teeth 338b can be inserted between the two driving gear teeth 357. As a result, the filter gear teeth 338b and the driving gear teeth 357 can be engaged with each other.

In summary, while the slip guide 339 moves along the direction F into the cabinet 100, the coupling boss 358 slides along the first inclined portion 339b or the second inclined portion 339b. Accordingly, the filter gear 338 and the driving gear 355 rotate and can be alternately arranged between the gear teeth of the filter gear 338 and the driving gear 355.

Figure 23:
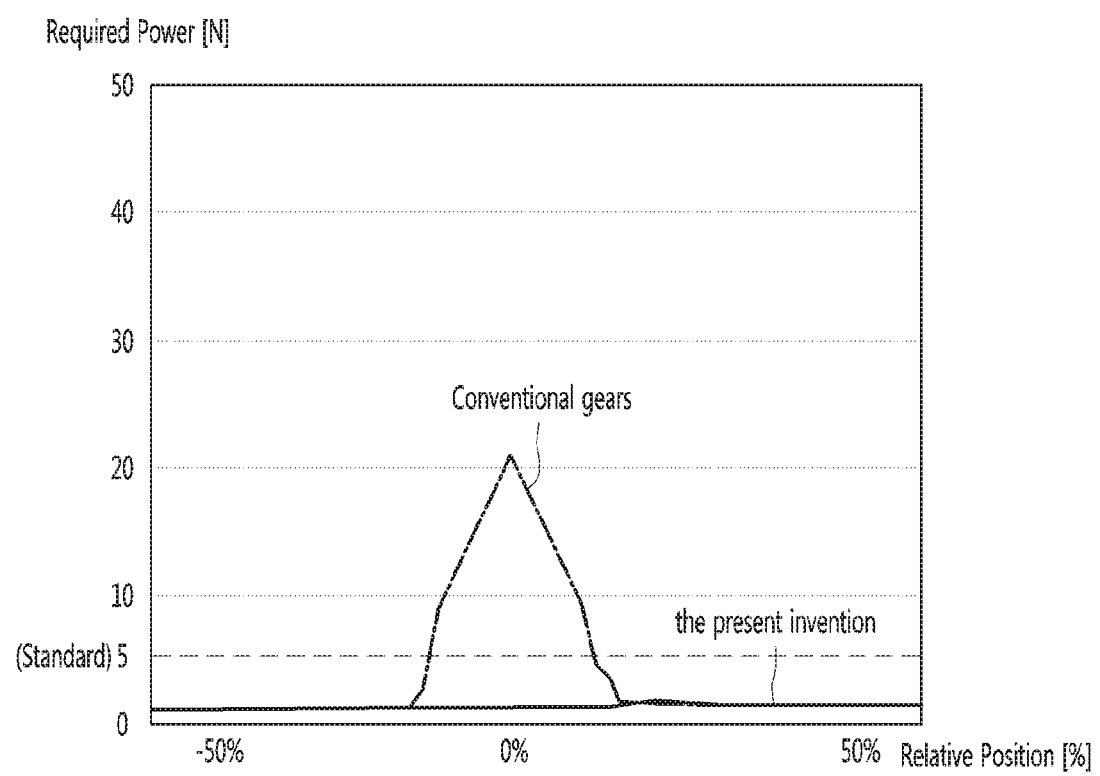
FIG. 23 is a graph illustrating a comparison of experimental results of a required force according to a relative position in a case where a humidifying filter driving gear and a filter gear according to an embodiment of the present invention are coupled.

FIG. 23 is a graph illustrating a comparative graph of the required force according to a relative position in a case where the humidifying filter driving gear and the filter gear according to the embodiment of the present invention are coupled to each other.

In a case where gears in the related art other than the filter gear 338 and the driving gear 355 according to the above-described embodiment are provided, the user must forcibly push the gear teeth of the filter gear 338 in such a way that the gear teeth of the filter gear 338 are positioned between the gear teeth of the drive gear 355. At this time, there is a problem that the force applied by the user is much larger than a case where the filter gear is drawn into the cabinet in the side direction of the humidifying filter driving gear.

The graph of FIG. 23 illustrates the required power N for engaging the filter gear 338 and the driving gear 355 in accordance with the relative position % between the filter gear 338 and the driving gear 355.

The relative position % is based on a case where the rear end surface of the gear teeth of the filter gear 338 is in contact with the front end surface of the gear teeth of the driving gear 355.

In other words, a case where the rear end of the filter gear teeth 338b comes into contact with the front end of the driving gear teeth 357 is defined as a reference (0%) of the relative position.

A right plus (+) direction from the reference (0%) is defined as a relative position where the filter gear teeth 338b is rotated in the first direction (clockwise direction) and contacts the driving gear teeth 357. A left negative (−) direction from the reference (0%) is defined as a relative position where the filter gear teeth 338b is rotated in the second direction (counter-clockwise direction) and contacts the driving gear teeth 357.

For example, it can be understood that the relative position +50% is a case where any one of the filter gear teeth 338b is rotated in the clockwise direction and completely positioned between the two filter gear teeth 338b. In this case, the force N required for the user to press the door assembly 200 can be minimized.

In addition, it can be understood that the relative position −50% is a case where any one of the filter gear teeth 338*b* is rotated in the counter-clockwise direction and completely positioned between the two filter gear teeth 338*b*. Therefore, the required force N at the relative position +50% and the relative position −50% is the same.

The required force N can define force required for coupling as the allowable reference when assuming that the above-mentioned filter gear is drawn into in the side direction of the humidifying filter driving gear. For example, the allowable reference may be 5 N (standard).

In a case where a filter gear and a humidifying filter driving gear that do not comply with the above-described embodiment of the present invention are provided (in the related art), a maximum force is required at the relative position 0%. At this time, the maximum force may be 20 N or more.

On the other hand, in a case where the filter gear 338 and the driving gear 355 according to the embodiment of the present invention are provided (in the present invention), it can be confirmed that the required force N according to the relative position is kept substantially constant within the allowable reference (5 N).

In other words, according to the filter gear 338 and the driving gear 355 according to the embodiment of the present invention, the filter gear 338 and the driving gear 355 can be easily engaged with each other in the front and rear direction.

Accordingly, the user can press the door assembly 200 with a relatively small force so that the filter gear 338 and the driving gear 355 can be coupled to be accurately engaged with each other.

Meanwhile, the driving gear 355 may be referred to as a first gear, and the filter gear 338 may be referred to as a second gear. In other words, the first gear fixed to the cabinet 100 can be easily coupled to the second gear which is drawn into or inserted into from the front.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. A humidifying air purifier comprising:
a body frame having a polyhedral shape;
a door assembly installed so as to be drawn out from the body frame and receiving a filter;
a fan housing coupled to the body frame and shielding a rear surface of the body frame, and having a fan intake through which air is introduced;
an air blowing fan aligned with the fan intake at a rear side of the fan housing;
a first motor coupled to a rear surface of the fan housing to provide a driving force to the air blowing fan and positioned at a center of the fan intake;
a second motor coupled to a front surface of the fan housing so as to be positioned outside the fan intake;
an air filter assembly accommodated in the door assembly;
a humidifying filter assembly accommodated in the door assembly to block a front of the second motor and disposed behind the air filter assembly; and
a buffer space defined between the air filter assembly and the humidifying filter assembly so as to cancel sound waves,
wherein:
a width of the buffer space in a direction from a front of the humidifying air purifier to a rear of the humidifying air purifier is defined as a distance between the air filter assembly and the humidifying filter assembly, and
the buffer space is formed so that a width (DH) of an upper end of the buffer space is larger than a width (DL) Of a lower end of the buffer space.

2. The humidifying air purifier according to claim 1, wherein the buffer space is formed so that a volume of the buffer space increases toward an upper portion of the buffer space.

3. The humidifying air purifier according to claim 1, wherein a direction in which the door assembly is drawn out is parallel to axial directions of the first motor and the second motor.

4. The humidifying air purifier according to claim 1, further comprising:
a plate for supporting electrical components, the plate being disposed to shield an upper surface of the body frame;
a housing cover coupled to the rear side of the fan housing and surrounding the air blowing fan;
a side panel coupled to each of opposite side surfaces of the body frame and extending above the plate for supporting electrical components;
a rear panel coupled to a rear end of each of the respective side panels and configured to shield a rear side of the housing cover;
an upper panel coupled to an upper end of each of the respective side panels and configured to cover an upper side of the plate for supporting electrical components; and
a door panel forming a front surface of the door assembly, wherein the door panel forms a flat surface with respective front ends of the upper panel and the side panels.

5. The humidifying air purifier according to claim 1, wherein the humidifying filter assembly includes:

a humidifying filter unit is configured to absorb water stored in a water storage container on the door assembly by rotation of the humidifying filter unit into the water;

a driving gear rotatably coupled to the second motor; and a filter gear installed on a rear side of the humidifying filter unit and engaged with the driving gear, wherein a direction of a rotational axis of the driving gear or the filter gear is the same as a direction in which the door assembly is drawn out from the body frame.

6. The humidifying air purifier according to claim 5, wherein the filter gear is configured to be engaged with the driving gear in a direction in which the door assembly is pushed into the body frame.

7. The humidifying air purifier according to claim 5, wherein the filter gear includes filter gear teeth; and slip guides protruding rearward from the filter gear teeth and configured to guide engagement of the filter gear teeth with the driving gear teeth.

8. The humidifying air purifier according to claim 7, wherein the driving gear includes coupling bosses protruding forward from the driving gear teeth and into contact with the slip guides.

9. The humidifying air purifier according to claim 1, further comprising:

a housing front cover covering a front surface of the fan housing; and a motor bracket configured to fix the second motor to the fan housing, wherein the motor bracket includes a louver guide which extends outwardly from a peripheral surface of the motor bracket; and a louver including a groove formed along a periphery of the louver and fitted into the louver guide.

10. The humidifying air purifier according to claim 9, further comprising:

a housing cover coupled to a rear of the fan housing and configured to accommodate the air blowing fan, wherein the housing front cover covers the second motor and the motor bracket.

11. The humidifying air purifier according to claim 1, further comprising:

a discharge port through which air passing through the air blowing fan is discharged, the discharge port being defined as a space formed by an upper end of the fan housing and an upper end of the housing cover.

12. A humidifying air purifier comprising:

a body frame having an open front surface;

a door assembly provided to be drawn out of the body frame;

a fan housing coupled to a rear surface of the body frame;

a fan intake formed in the fan housing and configured for the introduction of air into the fan housing;

a first motor coupled to a rear surface of the fan housing and positioned at a center of the fan intake, the first motor being configured to rotate an air blowing fan;

a second motor coupled to a front surface of the fan housing and positioned outside the fan intake;

an air filter assembly accommodated in the door assembly;

a humidifying filter unit accommodated in the door assembly, the humidifying filter unit being positioned in front of the second motor and behind the air filter assembly;

a humidifying filter supported by the humidifying filter unit in the door assembly;

a filter gear installed on a rear side of the humidifying filter unit; and a driving gear rotatably coupled to the second motor and interlocked with the filter gear, wherein the door assembly is drawn in or drawn out in the same direction as a rotation axis of the drive gear and the filter gear.

* * * * *